(12) United States Patent
Inaba

(10) Patent No.: US 9,952,495 B2
(45) Date of Patent: Apr. 24, 2018

(54) THREE-DIMENSIONAL VIDEO IMAGE PICK-UP AND DISPLAY SYSTEM USING A REFERENCE WINDOW AND STANDARD STEREOSCOPIC VIDEO DATA

(76) Inventor: Minoru Inaba, Tochigi (JP)

( * ) Notice: Subject to any disclaimer, the term of this patent is extended or adjusted under 35 U.S.C. 154(b) by 1838 days.

(21) Appl. No.: 13/144,270

(22) PCT Filed: Jan. 19, 2009

(86) PCT No.: PCT/JP2009/051136
§ 371 (c)(1),
(2), (4) Date: Aug. 19, 2011

(87) PCT Pub. No.: WO2010/082365
PCT Pub. Date: Jul. 22, 2010

(65) Prior Publication Data
US 2011/0298900 A1    Dec. 8, 2011

(51) Int. Cl.
| | |
|---|---|
| H04N 13/02 | (2006.01) |
| H04N 13/00 | (2018.01) |
| G03B 35/00 | (2006.01) |
| H04N 13/04 | (2006.01) |
| G02B 27/22 | (2018.01) |
| G02B 27/28 | (2006.01) |

(52) U.S. Cl.
CPC ......... *G03B 35/00* (2013.01); *H04N 13/0246* (2013.01); *H04N 13/0434* (2013.01); *H04N 13/0438* (2013.01); *G02B 27/2264* (2013.01); *G02B 27/28* (2013.01)

(58) Field of Classification Search
CPC .... G02B 27/2264; G02B 27/28; G03B 35/00; H04N 13/0246; H04N 13/0434; H04N 13/0438

USPC .......................................................... 348/47
See application file for complete search history.

(56) References Cited

U.S. PATENT DOCUMENTS

| | | | | |
|---|---|---|---|---|
| 6,177,952 | B1 * | 1/2001 | Tabata | G02B 27/017 348/47 |
| 6,798,406 | B1 * | 9/2004 | Jones | H04N 13/0011 345/419 |
| 7,493,037 | B2 | 2/2009 | Inaba | 396/324 |
| 8,451,326 | B2 | 5/2013 | Inaba | 348/58 |

(Continued)

FOREIGN PATENT DOCUMENTS

| | | |
|---|---|---|
| JP | 08-275207 | 10/1996 |
| JP | 2001-147401 | 5/2001 |

(Continued)

*Primary Examiner* — Jessica M Prince
(74) *Attorney, Agent, or Firm* — Fattibene and Fattibene LLC; Paul A. Fattibene

(57) ABSTRACT

A virtual field-of-view frame or reference window in a field of view of a stereo camera, and projected in a reduced manner by left and right shooting lenses to form an image on each of a left and right image pickup devices. Standard image data and stereoscopic video data is sent. The standard stereoscopic video data is displayed on a display screen having positions of left and right screens exactly matching each other and having the position and size for reproducing and displaying the reference window as a reference dimension display equivalent to the reference window, simultaneously with left and right polarizations. With eyeglasses for field-of-view separation left and right videos are separately viewed.

7 Claims, 13 Drawing Sheets

(56) References Cited

U.S. PATENT DOCUMENTS

| | | | |
|---|---|---|---|
| 2006/0203085 A1* | 9/2006 | Tomita | H04N 13/0018 348/51 |
| 2006/0204239 A1* | 9/2006 | Inaba | H04N 13/0029 396/325 |
| 2006/0214875 A1 | 9/2006 | Sonehara | 345/8 |
| 2008/0049100 A1* | 2/2008 | Lipton | H04N 13/0011 348/43 |
| 2010/0134602 A1* | 6/2010 | Inaba | H04N 13/0434 348/58 |

FOREIGN PATENT DOCUMENTS

| | | |
|---|---|---|
| JP | 2005-115276 | 4/2005 |
| JP | PCT/JP2007/070970 | * 10/2007 |
| JP | 2007-312402 | 11/2007 |

* cited by examiner

THREE-DIMENSIONAL VIDEO IMAGE PICK-UP AND DISPLAY SYSTEM USING A REFERENCE WINDOW AND STANDARD STEREOSCOPIC VIDEO DATA

TECHNICAL FIELD

The present invention relates to imaging and displaying of stereoscopic video (moving pictures and still pictures) in two-eye stereoscopy mode in which video shot by two, left and right lenses is viewed by each of the left and right eyes, pushing ahead with making video (image) stereoscopic in the field of transmission and reception of images using television broadcasting and communication lines and other fields, by utilizing the same video data even with different display screen sizes or different models of displaying apparatus.

BACKGROUND ART

Conventionally, electronic stereoscopic video imaging display systems in two-eye stereoscopy mode have been suggested, exhibited, and put on sale. Also, stereoscopic television broadcasting has already started in some places.

In these conventional electronic stereoscopic video imaging display systems, in order to use different systems for each model in a mixed manner, adjustment is required on a display side by shifting an image or the like. However, the adjusting method in these conventional methods is imperfect, and its general implementation is difficult.

(For example, refer to Patent Document 1).
Patent Document Japanese Unexamined Patent Application Publication No. 8-275207

DISCLOSURE OF INVENTION

Problem to be Solved by the Invention

Thus, in order to allow stereoscopic video to be reproduced on a display side without adjustment even with different models of stereoscopic video displaying apparatus, a technological problem to be solved occurs, and an object of the present invention is to solve this problem.

Means to Solve the Problem

The present invention is suggested to attain the object described above. In the invention described in an embodiment, a stereoscopic video imaging display system reproducing the state of stereoscopy with high fidelity is provided. A virtual field-of-view frame (defined as a reference window) is set in a field of view of a stereo camera configured of paired imaging units each configured of a shooting lens and an imaging pickup device placed on left and right in parallel to each other, and the reference window is projected in a reduced manner by the left and right shooting lenses to form an image on each of the left and right image pickup devices. Image data of an image of the reference window (in the window) formed on the left and right image pickup devices is read, and stereoscopic video data (defined as standard stereoscopic video data) is sent. On a display side, the standard stereoscopic video data is displayed with an electronic display on a display screen (a screen having the positions of left and right screens exactly matching each other and having the position and size for reproducing and displaying the reference window in full size is defined as a reference dimension display screen) equivalent to the reference window, simultaneously with left and right polarizations orthogonal to each other or circular polarizations in counterclockwise and clockwise directions or alternately with linear polarization in a same direction in a time-division manner. With eyeglasses for field-of-view separation corresponding to the polarizing scheme, left and right videos are separately viewed.

According to this configuration, by setting a reference window at the time of shooting, sending standard stereoscopic video data in a window projected to each of the left and right image pickup devices, and taking a screen in the case of enlarging and displaying it on a display side with the same size as the reference window as a reference dimension display screen of stereoscopic video display, shot image is reproduced with high fidelity.

In the invention described in another embodiment, a stereo camera is provided, in which a reference window, which is a virtual field-of-view frame, is set in a field of view of a stereo camera configured of two imaging units each configured of a shooting lens and an imaging pickup device placed on left and right in parallel to each other, image data in an image of each of the left and right reference windows projected in a reduced manner on each of the left and right image pickup devices is read, and standard stereoscopic video data is sent.

According to this configuration, by setting a reference window in the stereo camera, the sent image data is made to scale, and is send as standard stereoscopic video data. Thus, even when the stereo camera is singly used, the distance and size of the shot image can be accurately reproduced in a device on a reproducing side, the shot data can be commonly shared as standard stereoscopic video data irrespectively of the type and size of device.

In the invention described in another embodiment, an apparatus on a display side of a system in which a reference window, which is a virtual field-of-view frame, is set in a field of view of a stereo camera configured of two imaging units each configured of a shooting lens and an imaging pickup device placed on left and right in parallel to each other, image data in an image of each of the left and right reference windows projected in a reduced manner on each of the left and right image pickup devices is read and sent as standard stereoscopic video data, and stereoscopic video is displayed based on the standard stereoscopic video data. Display is made (simultaneously with left and right polarizations orthogonal to each other or circular polarizations in counterclockwise and clockwise directions or alternately with left and right polarizations in the same direction in a time-division manner) at same left and right arbitrary positions in an entire width of left and right fields of view within a left view angle determined by lines connecting both ends of the reference dimension display screen and a left eye of an observer and a right view angle determined by lines connecting both the ends of the reference dimension display screen and a right eye thereof. With this, stereoscopic video is reproduced with high fidelity.

According to this configuration, even when the actual display size of the stereoscopic video displaying apparatus is larger than the reference window (display screen in reference dimensions) set in the imaging apparatus, furthermore, is in an overlap display range in which left and right videos overlap each other, or is in a horizontal side-by-side display range in which left and right videos are placed side by side, it is enough to only display stereoscopic video data with a defined display width (depicted in FIG. 1) with respect to the display position (view distance).

In the invention described in another embodiment, a system using digital TV broadcasting waves as data conveying means from the stereoscopic video imaging apparatus for obtaining the standard stereoscopic video data to a stereo video displaying apparatus is provided.

According to this configuration, since the stereoscopic video data is standardized, stereoscopic television broadcasting can be achieved with the conventional system without requiring any special contrivance. In particular, digital TV broadcasting is transmitted as being divided into slots, has a margin of carrier waves even in the case of high-definition television, and is thus suitable for synchronizing two left and right video signals with each other for transmission.

In the invention described in another embodiment, a system using a communication line as data conveying means from the stereoscopic video imaging apparatus for obtaining stereoscopic video to a stereoscopic video display apparatus.

According to this configuration, since the stereoscopic video data is standardized, stereoscopic video can be freely transmitted and received over the Internet through a high-speed communication line (optical fiber).

In the invention described in another embodiment, a stereoscopic video displaying apparatus is provided, which is a stereo projector in which paired left and right projection units are placed side by side, and left and right linear polarizing filters in a direction in which they are orthogonal to each other or left and right circular-polarizing filters with rotating directions being opposite directions are mounted on the left and right units, respectively. A distance between optical axes of left and right projection lenses is set at a human interpupillary distance. And, left and right electronic displays are symmetrically offset or a display range is set offset so that left and right projection screens match each other (at a position) on a reference dimension display screen. And, a projection distance is set longer than a view distance.

According to this configuration, only display on the left and right electronic displays based on the standard stereoscopic video data is required. Irrespectively of the size of screen to be projected, in the entire projection range (from a small screen size with a short projection distance to a large screen size with a long projection distance), only focusing adjustment is required. And, substantial operations are similar to those for a mono projector.

Also, when the stereo projector is set at a position equivalent to the position of the eyes of the observer, a problem occurs such that the projector itself becomes an obstruction. This problem can be solved by setting the view distance longer than the projection distance.

In the invention described in another embodiment, a stereoscopic video displaying apparatus is provided, which is a stereo projector in which paired left and right projection units are placed side by side, and left and right linear polarizing filters in a direction in which they are orthogonal to each other or left and right circular-polarizing filters with rotating directions being opposite directions are mounted on the left and right units, respectively. A distance between optical axes of left and right projection lenses is set at a human interpupillary distance. And, left and right electronic displays are symmetrically offset or a display range is set offset so that left and right projection screens match each other (at a position) on a reference dimension display screen. And, a projection distance is set shorter than a view distance.

According to this configuration, the size of a rear-projection-type stereoscopic video displaying apparatus (rear-projection-type stereoscopic TV) in a depth direction can be advantageously made small (thin).

In the invention described in an embodiment, a stereoscopic video displaying apparatus is provided in which, with one projection unit formed of an electronic display and a projection lens, left and right images of stereoscopic video are alternately displayed in a time-division manner on a screen based on standard stereoscopic video, and the apparatus has an infrared-ray sending apparatus for synchronization placed therefor.

Also, when stereoscopic video is viewed with the stereoscopic video displaying apparatus of the embodiment described above, liquid-crystal shutter eyeglasses, which is of a conventional type, may be synchronized with infrared rays. Furthermore, optimally, a polarizing filter is mounted on the projector described above for alternately displaying the left and right videos of the stereoscopic video in a time-division manner with polarization in the same direction, and the left and right fields of view are separately viewed with "eyeglasses for stereoscopic video viewing."

Description of the "eyeglasses for stereoscopic video viewing": on the left and right sides of eyeglasses for stereoscopic video viewing for separately viewing left and right fields of view, left and right polarizing plate identical to each other are mounted, respectively. Furthermore, on its front surface, a liquid-crystal plate is mounted. Also, on the eyeglasses, a tilt-angle sensor is mounted. Light beams alternately reflected by the stereoscopic video displaying apparatus onto a screen are polarized light beams in the same direction. When the polarizing plates of the eyeglasses are set in a direction orthogonal to a direction of light-shielding of polarized light beams reflected from the screen, the left and right fields of view of the eyeglasses are closed to become dark. The state of the fields of view is changed in a manner such that a polarizing direction of reflected light from the screen is optically rotated by 90 degrees or 270 degrees by the liquid-crystal plate mounted on the front surface to cause both left and right fields of view to be in an open state and viewed brightly. When a voltage is alternately applied to the liquid-crystal plate mounted on the front surface of the eyeglasses with infrared rays sent in synchronization with a display image on the screen, the liquid crystal becomes in a tension state with that voltage. As for polarized light reflected from the screen and entering the eyeglasses, the polarizing direction is kept as it is, and light-shielding is made by the polarizing plates of the eyeglasses, causing the fields of view to be dark. At the same time, when a voltage is alternately applied to the liquid-crystal plates of the eyeglasses with infrared rays in synchronization with displayed video on the screen, the left and right fields of view are alternately opened and closed, and the left and right fields of view for viewing the screen is separated, thereby allowing stereoscopy. Also, when the eyeglasses are tilted, a relative directional relation between the screen and the polarizing direction of the eyeglasses is distorted to cause crosstalk, but the crosstalk is prevented by controlling and correcting the voltage to be applied to the liquid-crystal plate with the tilt-angle sensor.

In the invention described in another embodiment, a stereoscopic television is provided, in which a linear-polarizing filter is mounted on a front surface or a rear surface of a projection lens of a rear-projection-type TV having a reference dimension display screen using a DMD projection unit, left and right video are displayed in a time-division manner and, at the same time of time-division display, a synchronizing signal is sent from an infrared-ray synchronizing signal sending apparatus for field-of-view separation mounted on the TV.

According to this configuration, implementation can be easily achieved only by mounting a polarizing filter on a projection unit of the DMD-type rear-projection TV of a conventional type itself. Also, at the time of viewing, the eyeglasses for stereoscopic video viewing are used for stereoscopy.

In the invention described in another embodiment, a stereoscopic television is provided, which is a rear-projection-type TV having a reference dimension display screen using an LCOS unit, in which left and right videos are displayed in a time-division manner and, at the same time of time-division display, a synchronizing signal is sent from an infrared-ray synchronizing signal sending apparatus for field-of-view separation mounted on the TV.

According to this configuration, since light beams emitted from the LCOS device is polarized, a polarizing filter is not required to be mounted on the projection unit, which simplifies the television more than the DMD type above.

In the invention described in another embodiment, a liquid-crystal cell and a λ/4 plated are further added to the TV (of a DMD rear projector type) having the configuration described in an embodiment above. Linearly polarized light passing through a polarizing filter is alternately rotated in polarizing direction by the liquid-crystal cell so as to be incident at 45 degrees and −45 degrees with respect to a fast axis of the λ/4 plate, thereby displaying left and right images of stereoscopic video projected onto a transmission-type screen with circular polarization with rotation in different directions.

According to this configuration, since light beams for displaying left and right videos are circularly polarized with rotation in different directions, it is enough to use circular-polarization eyeglasses with opposite left and right glasses for viewing, and no infrared-ray synchronizing apparatus is required. Also, by using circular polarization, no crosstalk occurs even the viewer tilts his or her head (eyeglasses). However, since the operation of the λ/4 plate is unbalanced with respect to waveform, a light-shielding state may be incomplete in some cases, depending on the color.

In the invention described in another embodiment, the DMD unit described in an embodiment above is replaced by an LCOS unit.

According to this configuration, since light beams emitted from the LCOS device is polarized, a polarizing filter is not required to be mounted on the projection unit, which simplifies the television more than the DMD type above.

In the invention described in another embodiment, a stereoscopic television camera having a stereoscopic monitor is provided, and the stereoscopic monitor has an LCD disposed at a position near a distance of distinct vision from an observer. On the LCD, left and right videos are alternately displayed in a time-division manner. The left image for display is displayed with an entire width in left and right directions within a view angle determined by lines connecting both ends of a reference dimension display screen and the left eye of an observer and the right image for display is displayed with an entire width in left and right directions within a view angle determined by lines connecting both ends of the reference dimension display screen and the right eye of the observer. The observer mounts a polarizing plate immediately before eyeglasses mounted in left and right fields of view, the polarizing plate with its polarizing direction orthogonal to that of a polarizing plate on the LCD surface of the stereoscopic monitor, and drives the liquid-crystal plate with infrared rays for synchronization to open and close a field of view for viewing the display in a synchronized manner. Furthermore, an applied voltage of the liquid-crystal plate mounted immediately before the eyeglasses is controlled with a tilt-angle sensor mounted on the eyeglasses to prevent crosstalk. The observer can view stereoscopic video on the monitor equivalently to the reference window (with the same size and at the same position), and can also directly view an actual scene to be shot at the same time.

According to this configuration, the observer (cameraperson) can obtain the same sense of stereoscopy as that of a viewer of the stereoscopic television. Also, the cameraperson can observes the stereoscopic video on the monitor at a magnification ratio equal to that of the actual scene (the magnification ratio is not restricted to be equal depending on the shooting lens selected), and can also directly view an actual scene at the same time.

In the invention described in another, collimation patterns (left and right patterns superposing with each other to one) mainly formed of vertical lines are superimposed by software on a display screen of a stereoscopic monitor, thereby achieving viewability for stereoscopy, and the monitor is optimal for the monitor of the above embodiment.

According to this configuration, since the position where the reference window is set can be visually recognized, it is very effective if the position is displayed as being superposed on a monitor image of the stereoscopic television camera for use.

In the invention described in another embodiment, a stereoscopic video displaying apparatus (stereoscopic TV) is provided in which left and right videos based on standard stereoscopic video data are alternately displayed on an LCD panel in a time-division manner, and also an infrared-ray synchronizing signal sending apparatus for synchronizing eyeglasses for field-of-view separation is included.

According to this configuration, since the components of the conventional LCD-type TV can also be used, video can be easily made stereoscopic. Also, with standardization of stereoscopic video data, display can be made without adjustment even with different display sizes.

In the invention described in another embodiment, a stereoscopic video displaying apparatus is provided, in which, with respect to an electronic display, eyeglasses for field-of-view separation for separating left and right fields of view and diopter correction lenses (plus-diopter lenses for focusing the eyes of the observer when viewing a subject at a distance shorter than a distance of distinct vision) are superposed with each other and in a state in which the display is observed at the distance shorter than the distance of distinct vision, video is displayed on the display in a time-division manner alternately within left and right field-of-view ranges determined by lines connecting both ends of a reference dimension display screen of the stereoscopic video and the left and right eyes of the observer, and the left and right fields of view are viewed by operating the eyeglasses for field-of-view separation in synchronization with the left and right videos.

According to this configuration, even when a small-sized display is used, viewing can be made with a sense of stereoscopy equivalent to that when a large-sized display is used.

In the invention described in an embodiment, a stereoscopic video displaying apparatus is provided, in which, with respect to an electronic display, eyeglasses for field-of-view separation for separating left and right fields of view are placed so as to be in a state observation at a distance longer than the distance of distinct vision, video is displayed on the display in a time-division manner alternately within left and right field-of-view ranges determined by lines connecting both ends of a reference dimension display screen of the stereoscopic video and the left and right eyes of the observer, and the left and right fields of view are viewed by operating the eyeglasses for field-of-view separation in synchronization with the left and right videos.

According to this configuration, although the apparatus becomes larger than the stereoscopic video displaying apparatus described in an embodiment above, eyeglasses for diopter correction are not required for a person having a normal diopter (a person who can most easily view with the naked eye at the distance of distinct vision).

In these stereoscopic video displaying apparatuses described in the above embodiments, by fixing eyeglasses for field-of-view separation to the display, no crosstalk occurs even when the observer tilts his or her head.

In the invention described in another embodiment, a stereo photo print or stereo slide is provided which is of a type of recording two left and right screens so that they are placed side by side on one sheet or film from standard stereoscopic video data.

According to this configuration, a stereo photo print or stereo slide having a spacing between the left and right screens being set in an optimal state can be obtained.

Effects of the Invention

According to the invention described in claim 1 an embodiment, in the entire processing from imaging to display of stereoscopic video, any video can be easily made stereoscopic with the existing devises and element techniques. This can be put on existing media (for example, digital TV broadcasting, the Internet, and DVD) and also has an advantage of easily switching from mono to stereo of video over TV broadcasting, the Internet, and others.

According to the invention described in another embodiment, stereo cameras can be standardized. This standardization can be achieved irrespectively of the size of image pickup device. Also, a finder is not necessarily viewed stereoscopically.

According to the invention described in another embodiment, from a huge screen size for showing in a movie theater to a small-sized television (the overlap display range) and, furthermore, a range where left and right small-sized displays are separately provided for display (the horizontal side-by-side display range) can be displayed with the same image data. Even with different types and sizes of display, the same sense of stereoscopy can be obtained without adjustment. Therefore, it is extremely useful when stereoscopic TV broadcasting is generalized (implemented). This is because, although various specifications of stereoscopic broadcasting on a transmission side can be unified, those on a receiving viewer side cannot be unified under various circumstances (for example, different sizes of TV to be placed are inevitable due to economic circumstances, the side of a room, and others).

The invention described in an embodiment is the one by applying the invention described in another embodiment, and is directed to a substantially only method in implementing stereoscopic TV broadcasting, and achieves the effect of digital TV broadcasting at its best. This is because digital TV broadcasting is transmitted into slots, and the capacity of two channels of the current digital high-definition television can be transmitted simultaneously.

The invention described in an embodiment is the one by applying the invention described in another embodiment, and is directed to a substantially only method in implementing transmission and reception of stereoscopic video data through a communication line. Even with difference screen sized on transmission and reception sides, no process (no adjustment) is required on neither one of the transmission side and the reception side, and also the same sense can be achieved as to the sense of stereoscopy and the size of a subject. Furthermore, integration with stereoscopic TV broadcasting is advantageously possible.

Also, a stereo photo print with left and right images placed side by side can be exchanged over the Internet. Further, similarly, an order for a stereo slide of a silver-salt scheme can be advantageously sent as image data over the Internet.

According to the invention described in an embodiment, by setting the distance between the optical axes of the left and right projection lenses of the stereo projector in which paired left and right projection units are placed side by side and by setting the spacing between electronic displays of the left and right projection units longer than the distance between the optical axes, the corresponding points of the image at infinity based on standard stereoscopic video can be reproduced as being in a predetermined spacing equal to the interpupillary distance irrespectively of the screen size. Also, irrespectively of the projection screen size, the left and right videos can be viewed equivalently to the reference dimension display screen. Thus, "operation" at the time of projection is focus adjustment, and even a stereo projector can be handled equivalently to a mono projector. This problem of handling ability is a very important element in widespread to the public.

Also, by setting the projection distance of the reference dimension display screen longer than a recommended view distance (an optimum distance when the reference dimension display screen is viewed. For example, in FIG. 1, 2.5 meters), it can be avoided for the projector from becoming an obstruction at the time of viewing.

According to the invention described in an embodiment, by setting the distance between the optical axes of the left and right projection lenses of the stereo projector in which paired left and right projection units are placed side by side at a human interpupillary distance and by setting the spacing between electronic displays of the left and right projection units longer than the distance between the optical axes, the corresponding points of the image at infinity can be reproduced as being in a predetermined spacing equal to the interpupillary distance irrespectively of the projection distance and, also, irrespectively of the projection screen size, the left and right videos can be viewed equivalently to the reference dimension display screen. Furthermore, by setting the projection distance of the reference dimension display screen shorter than the recommended view distance (an optimum distance when the reference dimension display screen is viewed. For example, in FIG. 1, 2.5 meters), the depth dimension of a projection-unit-incorporated-type stereoscopic video displaying apparatus, such as a rear-projection TV, can be advantageously made small (thin).

A feature of the invention described in an embodiment is that the invention can be achieved with a simple structure only with an infrared-ray synchronizing apparatus being coupled to a mono projector of a conventional type.

In the invention described in an embodiment, in structure, polarizing filters are mounted on a rear-projection-type mono television formed of a DMD unit for alternately displaying left and right videos and, with liquid-crystal eyeglasses, the left and right fields of view are simultaneously opened and closed for separate viewing. Also, with the screen size being set as the reference dimension size, it is enough to alternately display the left and right images based on the standard stereoscopic video data on the DMD, no non-display zone is required to be provided at a portion of a small element, such as the DMD, and all pixels of the DMD can be effectively used. Also, only one projection lens is needed. And, by setting the projection distance of the reference dimension display screen shorter than the recommended view distance, the depth dimension of the rear-projection-type stereoscopic video display apparatus (stereoscopic TV) can be advantageously made small.

According to this configuration, even in the case of a stereoscopic television, implementation can be achieved with an approximately same structure as that of a conventional DMD-type projection television (of a mono type), and therefore the television can be inexpensively produced.

In the invention described in an embodiment, the DMD unit of the invention described in another embodiment is replaced by an LCOS unit.

According to this configuration, since light beams emitted from the LCOS unit are polarized, no polarizing filter is required. Therefore, not only the price can be reduced by the cost of the filter, but also a loss in light amount due to the polarizing filter can be reduced.

In the invention described in an embodiment, subsequent to the polarizing filter of the rear-projection-type television formed of the DMD projection unit described in another embodiment above, a liquid-crystal cell and a λ/4 plate are disposed in this order for alternately displaying left and right videos; by applying a voltage to the liquid-crystal cell in synchronization with a display of the DMD and alternately inputting linear polarizing light with its amplifying direction at an angle of ±45 degrees with respect to a fast axis of the λ/4 plate, circular polarizations in opposite counterclockwise and clockwise directions are achieved. The observer separately views the left and right fields of view uses circular-polarizing eyeglasses in reverse counterclockwise and clockwise directions for separate viewing of the left and right fields of view.

According to this configuration, although the left and right videos are alternately displayed in a time-division manner, synchronization of the eyeglasses for viewing is not required. Therefore, not only a reduction in cost of the eyeglasses for viewing, but also removal of inconvenience of mounting a battery on the eyeglasses can be achieved. Furthermore, in a projection-type television, the diameter of each of the polarizing filter, the liquid-crystal cell, and the λ/4 plate can be advantageously small so as to be approximately equal to the diameter of the lens for projection.

In the invention described in an embodiment, the DMD unit described in another embodiment above is replaced by an LCOS unit.

According to this configuration, since light emitted from the LCOS unit is polarized, no polarizing filter is required. Therefore, a loss in light amount is reduced.

A feature of the invention described in an embodiment is that stereoscopic video is displayed on a stereoscopic monitor of a stereoscopic television camera, and the stereoscopic video on the monitor can be observed in the same size as the actual scene to be shot. Therefore, the cameraperson can view stereoscopic video with the same sense as that of the stereoscopic video being observed by the viewer. Furthermore, the actual scene can be directly viewed at the same time when the stereoscopic video on the monitor can be viewed.

According to this configuration, the cameraperson can always observe the shot recording or the transmitted stereoscopic video on the monitor and, at the same time, directly view the actual scene for comparison. Furthermore, whether in mono or stereo, when moving pictures are shot, it is important to know the progress of situations simultaneously at the time of shooting. Therefore, an operational effect of this television camera configured so as to allow an actual scene to be always viewed simultaneously at the time of monitoring is enormous.

A feature of the invention described in an embodiment is that collimation patterns are displayed by software in a superimposing manner on a monitor of the stereoscopic imaging apparatus for simultaneous stereoscopy as being superposed with stereoscopic video, thereby improving viewability of determining whether the sense of stereoscopy is excellent.

According to this configuration, a shooting person can instantaneously determine whether the sense of stereoscopy is appropriate in shooting stereoscopic video.

In the invention described in an embodiment, it is enough only to alternately display left and right videos of stereoscopic videos based on standard stereoscopic video data on a conventional liquid crystal TV in a time-division manner and, at the same time, send an infrared-ray synchronizing signal for eyeglasses for field-of-view separation.

According to this configuration, a stereoscopic video displaying apparatus can be most easily achieved.

A feature of the invention described in an embodiment is that an electronic display that alternately displays standard stereoscopic videos in a time-division manner and the eyeglasses for field-of-view separation are fixed to each other to prevent the occurrence of crosstalk, and also eyeglasses for diopter correction are placed so as to observe at a position at a distance shorter than the distance of distinct vision.

According to this configuration, with the display and the eyeglasses for field-of-view separation being fixed to each other, even when the observer tilts his or her head, there is no fear of occurrence of crosstalk. Also, by mounting the eyeglasses for diopter correction, observation is possible at a position at a distance shorter than the distance of distinct vision, and stereoscopic video can be observed with a large screen (reference dimension display screen) even a small display is used.

Also, this configuration is very effective when used as a finder (monitor) of a stereoscopic video imaging apparatus. This is because the outer shape can be made small-sized, portability and handling ability are excellent and, in addition, since light-shielded from external light, the finder has an improved viewability under a bright environment, such as outdoors in the daytime.

A feature of the invention described in an embodiment is that an electronic display that alternately displays standard stereoscopic videos in a time-division manner and the eyeglasses for field-of-view separation are fixed to each other to prevent the occurrence of crosstalk, and also the eyeglasses for field-of-view separation are placed at a position so as to allow observation at a distance longer than the distance of distinct vision of the display.

According to this configuration, no eyeglasses for diopter correction are required. Eyeglasses for diopter correction normally used by the observer himself or herself (for near sight, long sight, or presbyopia) or the like may be used, or viewing may be performed with the naked eye.

Furthermore, a feature of the inventions described in embodiments is that the observer does not wear eyeglasses for field-of-view separation. Although only one person can view with these stereoscopic video displaying apparatuses, for example, in public setting-up situations, sharing things in direct contact with the skin, such as eyeglasses for viewing (for field-of-view separation), is not preferable in view of sanitation.

A feature of the invention described in an embodiment is that left and right images of a stereoscopic photograph can be recorded so as to be placed side by side on one sheet.

According to this configuration, even with different formats (screen sizes), a stereo photo print or stereo slide can be easily created with an optimal screen spacing.

DESCRIPTION OF NUMERALS

Figure 1:
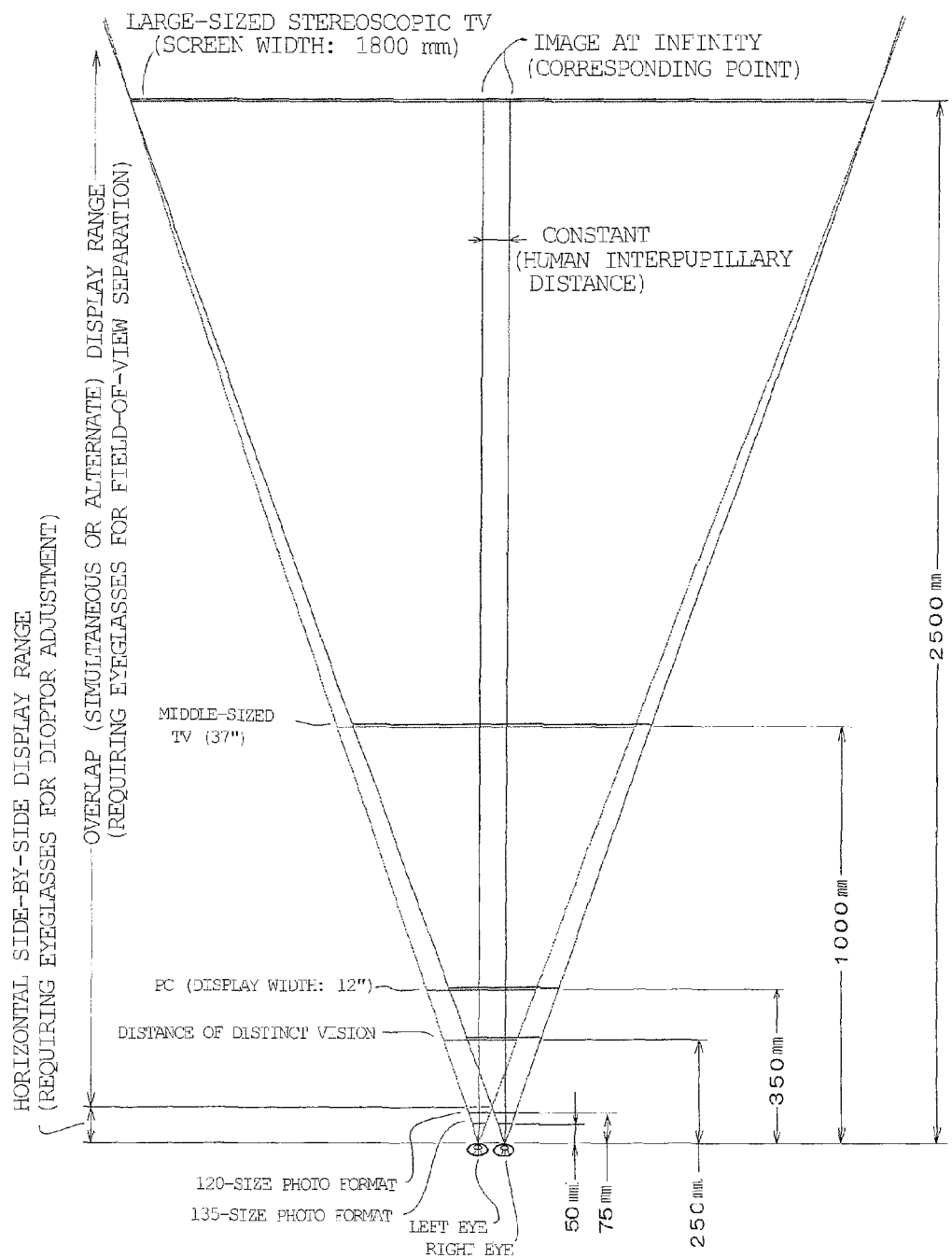
FIG. 1 A conceptual diagram of stereoscopy of the present invention.

B human interpupillary distance
L distance to a reference dimension display screen
$E_L$ left eye
$E_R$ right eye
D display
$I_\infty$ image at infinity
$W_D$ width of the display
$E_{ref}$ display of equivalent reference window (reference dimension display screen)
$W_{ref}$ reference window
$W_W$ reference window width
S image pickup device
$I_{ref}$ image in the reference window on the image pickup device
α a view angle
F focal length
$W_S$ width of the image pickup device
$D_S$ spacing between left and right image pickup devices
$O_\infty$ infinity body
Φ optical axis of a stereo camera
$D_0$ display in reference dimensions
$D_1$ display smaller than reference dimensions within an overlap display range
$D_2$ display or stereo slide within a horizontal side-by-side display range
$W_{P0}$ width of the display $D_0$
$W_{P1}$ width of (a part of) the display $D_1$
$W_{P2}$ width of each of the left and right displays
$D_{P1}$ spacing (picture distance) between left and right displayed on the display $D_1$
$D_{P2}$ placement spacing between the left and right displays or picture distance of the stereo slide
$L_0$ set distance in reference dimensions
$L_1$ distance to the display $D_1$
$L_2$ set distance to the display $D_2$ or the stereo slide within the horizontal side-by-side display range
$L_X$ boundary point (in principle) between the horizontal side-by-side display range and the overlap display range
$W_{ref}'$ matching point between left and right shooting fields of view when wide-angle lenses are mounted
$W_{ref}''$ matching point between left and right shooting fields of view when long-focus lenses are mounted
$P_L$ display range of a left screen of a screen size larger than the reference dimensions
$R_R$ display range of a right screen of a screen size larger than the reference dimensions
$S_0$ screen at a reference dimension display screen position
$S_1$ screen positioned at a short distance (1 meter)
$S_2$ screen positioned at a distance where left and right videos are placed side by side
$S_3$ screen positioned far away from the reference dimension display screen position
60 projector
61 projection lens
62 display
$D_D$ spacing between the displays
$W_D$ display width
θ projection angle
71 screen equivalent to the reference dimension display screen
72 projection lens
73 display
0 point of application of the projection lens
X position (optical-axis extending point) where a corresponding point of an image at infinity is to be displayed
81 DMD or LCOS display (projection) unit
82 projection lens
83 polarizing filter
84 transmission screen
85 eyeglasses for stereoscopic video viewing
91 DMD or LCOS display (projection) unit
92 projection lens
93 polarizing filter
94 liquid-crystal cell
λ/4 plate
96 transmission screen
97 circular-polarizing eyeglasses
100 reference window (virtual field-of-view frame)
101 stereoscopic monitor of the stereo TV camera
102 stereo TV camera
103 eyeglasses for stereoscopic video viewing
104 cameraperson
CP collimation pattern
121 display
122 board
123 housing
130 eyeglasses for field-of-view separation 131 liquid-crystal plate
132 polarizing plate
133 eyeglasses for diopter correction

BEST MODES FOR CARRYING OUT THE INVENTION

A feature of the present invention is that stereoscopic video data can be shared for use even with different sizes of image pickup device of a stereo camera and different display ranges and screen sizes of stereoscopic displaying apparatus, and a reference window is set at the time of shooting so as to make a depth perception and dimensions of every stereoscopic video commonly recognized. And, this reference window is shot as field-of-view frames (left and right image frames), and is sent as reference stereoscopic video data necessary for display. Then, on a display side, the standard stereo video data is displayed on a screen in reference dimensions equivalent to the reference window on a shooting side, thereby reproducing a high-fidelity sense of stereoscopy.

Figure 2:
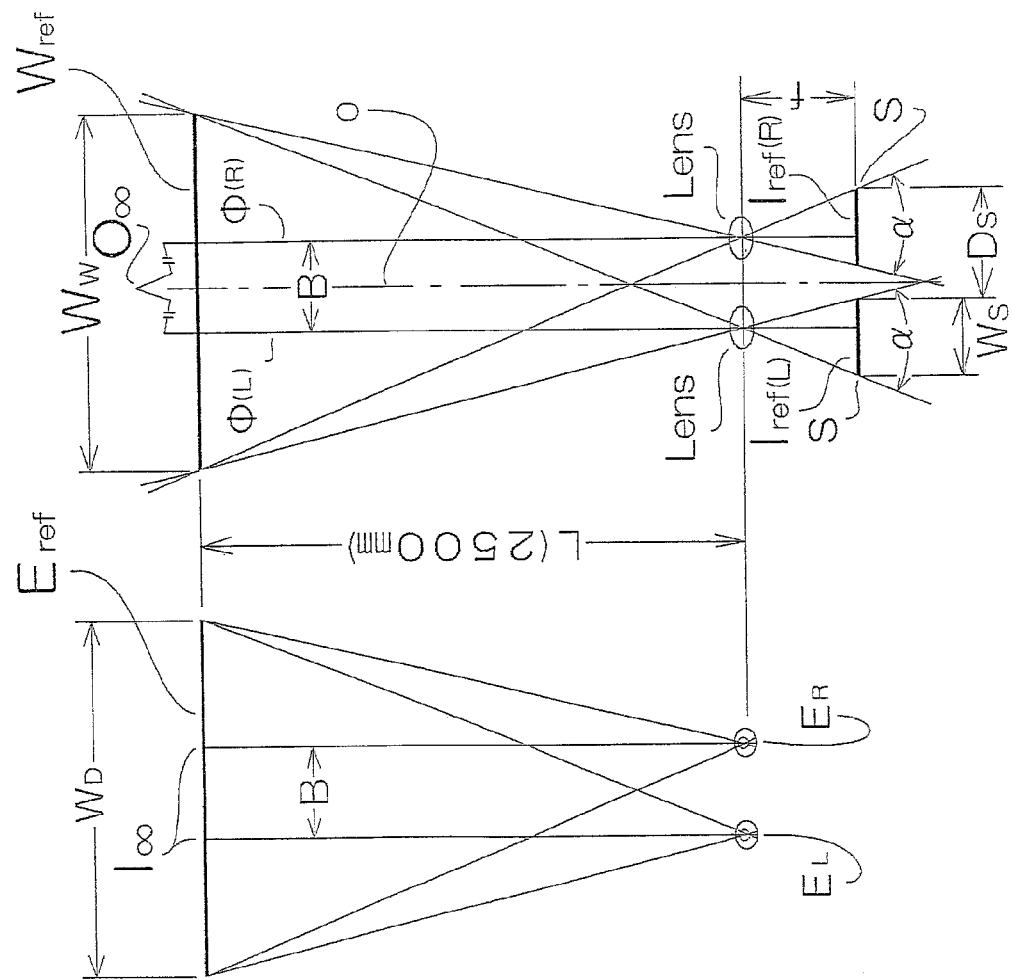
FIG. 2 A diagram of a relation between a reference dimension display screen (a large-sized stereoscopic TV depicted) in FIG. 1 and a stereo camera that sends standard stereoscopic video data.

For example, in FIG. 2, when it is assumed that a width of a reference window $W_{ref} \ldots W_W$,
a width of an image, $I_{ref(L)}$ and $I_{ref(R)}$, within the reference window projected onto the respective image pickup device having a width $W_S$, and
a display screen width in reference dimensions ... $W_D$,
a shooting magnifying power r is $r=W_S/W_W$,
a display magnifying power R is $R=W_D/W_S$, and
$r \times R=1$. According to the equations above, it can be understood that making image data sent from the stereo camera as standard stereoscopic video data is easy, irrespectively of the width $W_S$ of the image pickup device.

First Embodiment

FIG. 1 is a conceptual diagram of stereoscopy. With a large-sized stereoscopic TV depicted in the drawing being taken as a television with a standard dimension display screen (a display width of 1800 mm), display screens of various sizes and their arrangement have a relation depicted in the drawing.

Figure 3:
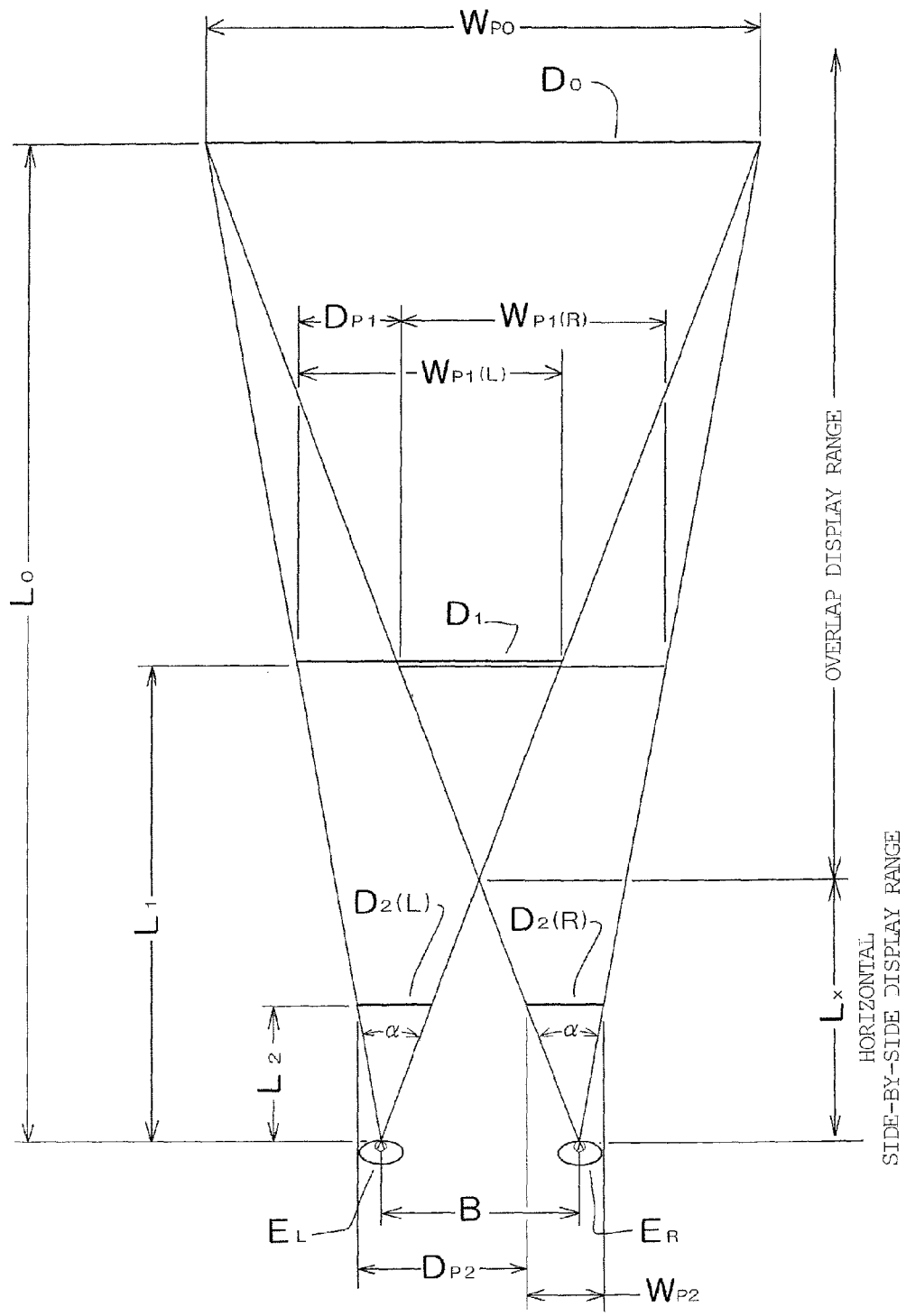
FIG. 3 A detailed descriptive diagram of FIG. 1.

FIG. 3 illustrates dimensions and an arrangement relation in FIG. 1 in more detail. In FIG. 3, in contrast to an actual dimensional ratio, representation is shown at a dimensional ratio that increases as it is closer to the observer's position. This is to avoid congestion in plotting.

In FIG. 3, a distance $L_X$ from the eyes of an observer to a boundary between a horizontal side-by-side display range and an overlap display range depicted in the drawing has a relation of $L_X=L_0/(1+W_{P0}/B)$, and
when it is assumed that $L_0=2500$ mm and $W_{P0}=1800$ mm and
when an interpupillary distance dimension is B=58 mm, $L_X=2500/(1+1800/58)=78.04$ mm, and
when the interpupillary distance dimension is B=72 mm, $L_X=2500/(1+1800/72)=96.15$ mm.

In the horizontal side-by-side display range, a barrier wall is required for partitioning into left and right fields of view, and an actual view distance has a limit of approximately 75 mm. Also, since 75 mm is very near compared with a distance of distinct vision, a loupe for diopter adjustment is required. A loupe with a focal length slightly longer than the viewing distance is proper. Therefore, in this case, an appropriate focal length of the loupe for use is approximately 80 mm.

Also, although the interpupillary distance dimension (on a stereo base) B varies to some degree among observers, when the view distance is long (overlap display range), some difference between the spacing between left and right corresponding points of an image at infinity and the interpupillary distance dimension B may be ignored.

And, in the horizontal side-by-side display range, although a margin of a difference with the interpupillary distance dimension B is small, the difference is mitigated by adjusting the spacing between diopter adjusting lenses.

A spacing between left and right screens, that is, a picture distance, has the following relation with the horizontal interpupillary spacing B and a distance $L_0$ to a display $D_0$ in reference dimensions. A picture distance $D_{PN}$ of a display $D_N$ disposed at an arbitrary distance $L_N$ has a value of $D_{PN}=B(1-L_N/L_0)$.

A width $W_{P0}$ of each of left and right screens is proportional to the distance from the eyes of the observer. Since left and right visual angles α depicted in the drawing formed by interposing the display $D_0$ between light beams entering each eye are the same, respective apparent screen widths depicted in FIG. 3 have a relation of $W_{P0}=W_{P1}=W_{P2}$, and therefore the screens can be viewed as having the same size.

As described above, by displaying standard stereoscopic video data on a TV with the reference dimension display screen (a large-sized TV depicted in FIG. 1) in a relation and arrangement depicted in FIG. 1, common data can be used in all display ranges from the overlap display range with left and right images superposed thereon to the horizontal side-by-side display range having separate left and right display surfaces. In this case, on each display depicted in the drawing, it is enough to only arrange and display the standard stereoscopic video data (at a position and with a width) under conditions independently defined for left and right.

FIG. 2 is a diagram for describing a stereo camera as a means obtaining stereoscopic image data in the relation and arrangement depicted in FIG. 1. FIG. 2(a) is a diagram of a state exactly the same as the state of stereoscopy of FIG. 1, and FIG. 2(b) is a relation diagram in the case of using a stereo camera. Now, when it is assumed that a display $E_{ref}$ of an equivalent reference window depicted in FIG. 2(a) is a display of the television with a reference dimension display screen of FIG. 1 (the large-sized stereoscopic TV depicted in FIG. 1), a reference window $W_{ref}$ is set to the stereo camera of FIG. 2(b), and the spacing between left and right shooting lenses of the camera is the interpupillary distance dimension B, a conjugate relation establishes between a distance from the display $E_{ref}$ of the equivalent reference window of FIG. 2(a) to left and right eyes $E_L$ and $E_R$ of the observer and a distance from the reference window $W_{ref}$ having a width $W_W$ to left and right shooting lenses $L_L$ and $L_R$. Therefore, image data on the image pickup device disposed in each of the left and right view angles α is the same as that when a person actually observes the television with the reference dimension display screen of FIG. 1 (the large-sized stereoscopic TV depicted in the drawing). Also, the size (width) of the image pickup device disposed in the view angle α is determined by the position of the image pickup device in an optical-axis direction.

In FIG. 2(b), the width $W_S$ of the image pickup device is calculated by $W_S=W_W \times f/L$. Also, the spacing between the left and right image pickup devices (picture distance in an inverted image state), that is, $D_s$ depicted in the drawing, is calculated by $D_S=B(1+f/L)$, which is longer than the spacing between the left and right shooting lenses=human interpupillary width $B$.

An image projected on each image pickup device is in an inverted state. When the image is rotated at 180 degrees at each of the left and right positions for erection, the spacing between the left and right screens, that is, the picture distance (on a display side=an erect image state), becomes shorter than the human interpupillary distance B. Also, two triangles (two triangles partially overlapping each other) each configured of the reference window $W_{ref}$ depicted in FIG. 2(b) and lines each passing through a principal point of a corresponding one of the left and right shooting lenses, the lines between which the window $W_W$ of the reference window $W_{ref}$ is interposed, and two triangles configured of lines each passing though the principal point of a corresponding one of the left and right shooting lenses, the lines between which both ends of a corresponding one of the left and right image pickup devices S, and a surface of the image pickup device itself are similar figures symmetric with respect to the principal point of a corresponding one of the left and right shooting lenses. Also, since left and right units are symmetric with reference to a center line 0 depicted in the drawing, when the drawing is folded along the center line 0 on the paper as a folding line, left and right optical axes $\Phi(L)$ and $\Phi(R)$ match each other, and the left and right axes overlap each other. Therefore, stereoscopic videos shot by the stereo camera of FIG. 2(b) are displayed at the same screen position on the TV with the reference dimension display screen of FIG. 1 (the large-sized stereoscopic television depicted in the drawing) alternately in a time-division manner or in a manner such that they are simultaneously superposed by polarization or the like, and when the left and right screens are viewed with the left and right eyes through eyeglasses for field-of-view separation, the corresponding points of the image at infinity are displayed by itself at the human interpupillary distance. Thus, stereoscopic video in an optimum state can be reproduced. Here, for projection at the same position with reference dimensions, no special measures are required, and it is enough to display an image on the image pickup device S depicted in FIG. 2(b) at a display magnifying power of $W_D/W_S$, which is a simple ratio between the screen width $W_D$ of the display D and the width $W_S$ of the image pickup device.

Also, each of the left and right screen widths of respective sizes depicted in FIG. 1 is determined at a ratio between a distance of arrangement of each displaying apparatus and a distance to the TV with the reference dimension display screen (in FIG. 3, $L_1/L_0=W_{P1}/W_{P0}$). Therefore, since the left and right display screen widths are easily calculated because of having a simple ratio.

And, as depicted in FIG. 1, in stereoscopic video, the corresponding points at infinity should be displayed in all regions with the human interpupillary distance spacing. Thus, infinity=interpupillary distance=distance between optical axes of the left and right shooting lenses and, since light beams from the corresponding points at infinity entering the left and right shooting lenses of the stereo camera are parallel to each other, the corresponding points of the image at infinity projected onto the image pickup devices have a space equal to the distance between optical axes. Therefore, even with any display size, the spacing between the corresponding points at infinity between the left and right display screens=the human interpupillary distance can be set only by setting a corresponding center position of the optical axis of each of the left and right shooting lenses on the left and right image pickup devices at a position so that the spacing between the left and right positions on the display screen is equal to the human interpupillary distance spacing. That is, even with a stereoscopic displaying apparatus of any screen size, with reference to the left and right optical axes of the stereo camera, a spacing corresponding to the spacing between the left and right optical axes of the imaging unit is displayed on left and right of a reproduction screen so as to have a dimension equal to the human interpupillary distance.

Figure 4:
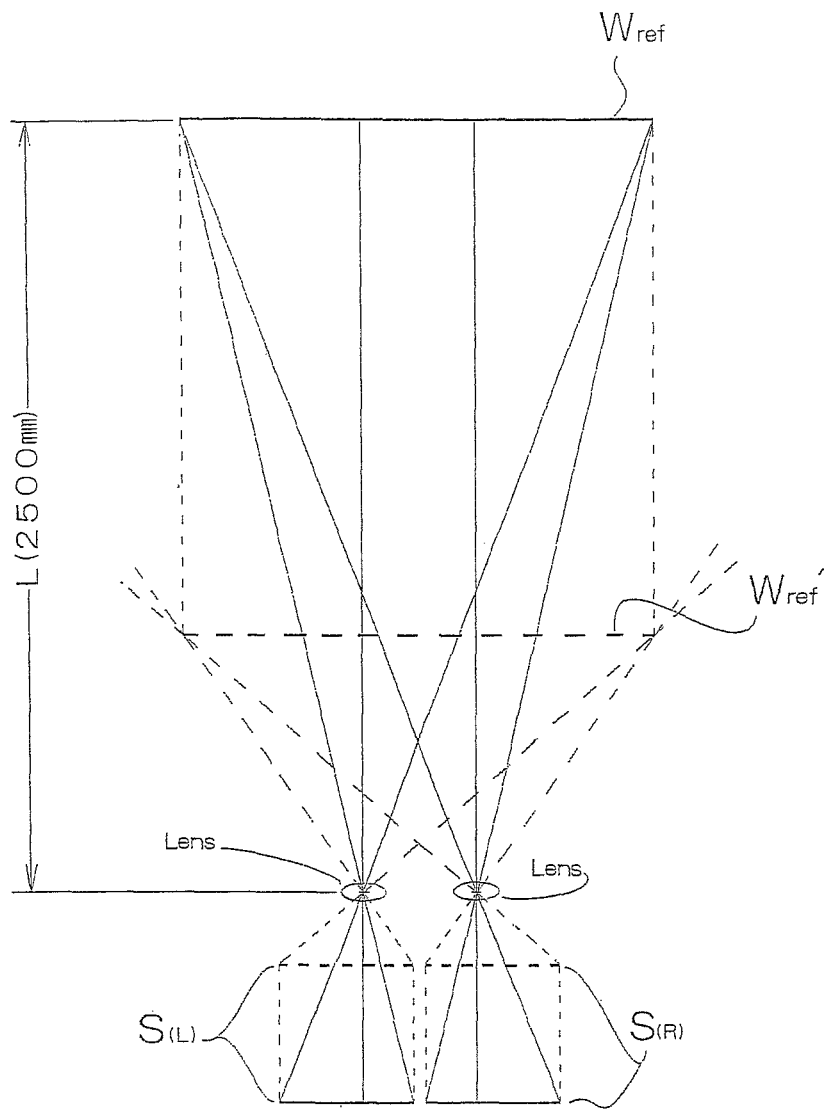
FIG. 4 A descriptive diagram when wide-angle shooting lenses are mounted on the stereo camera of FIG. 2(b).

FIG. 4 is a diagram of a state when the shooting lenses of the camera in the state depicted in FIG. 2 are replaced by wide-angle shooting lenses. To shoot a subject of the same size at a wide angle, the working distance is short. Also, to form an image on an image pickup device of the same size, the focal length of each shooting lens is short. As depicted in FIG. 4, when the lenses are replaced by shooting lenses of a short focal length, the distance at which left and right fields of view match each other in stereoscopy is also short. If an actual scene is directly viewed by the naked eye, when infinity (infinity in a sense of photo shooting) is included in a field-of-view frame $W_{ref}'$ at a position depicted in FIG. 4 with a broken line, it is impossible to view a near-distance subject and a long-distance subject at the same time in stereoscopy (when a person views an actual scene, it seems that a narrow field of view is instantaneously viewed at every moment for intracerebral process, thereby allowing viewing in practice, but this causes fatigue to optic nerves). However, when stereoscopic image data shot by a camera in this state (shooting is performed by shooting lenses of a short focal length and the left and right fields of view match each other at a short shooting distance) is viewed with a stereoscopic television with a reference dimension display screen depicted in FIG. 1, the state of stereoscopy is excellent. When the reference window $W_{ref}'$ depicted in FIG. 4 with the broken line is set, if an actual scene is directly viewed from that window, which is assumed to be real, parallax between a near-distance scene and a long-distance scene is large, and therefore it is impossible in stereoscopy to view the left and right fields of view as one. However, this stereoscopic video data is viewed with each displaying apparatus in the state of settings depicted in FIG. 1, the reference window $W_{ref}'$ depicted in FIG. 4 with the broken line can be viewed as being far away to a position of a reference window $W_{ref}$ depicted in the drawing with a solid line, thereby allowing stereoscopy normally. Therefore, the use of wide-angle shooting lenses is advantageous because shooting can be performed in a narrow place by getting closer to a subject.

Figure 5:
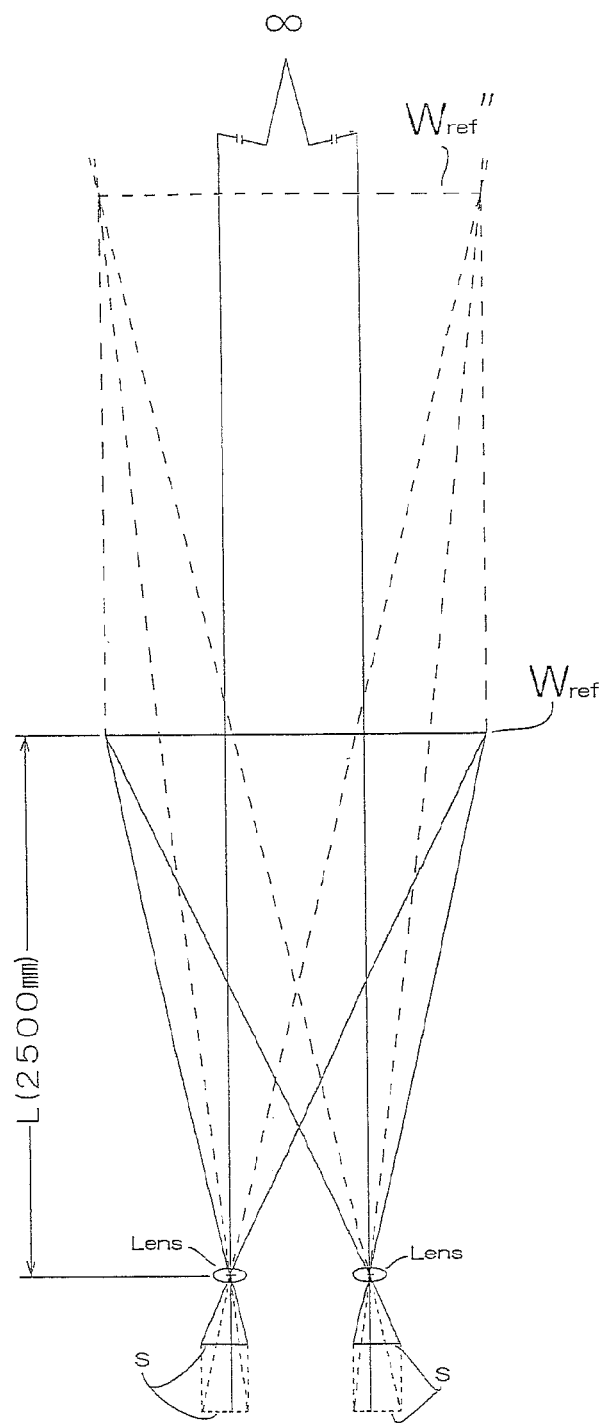
FIG. 5 A descriptive diagram when long-focus shooting lenses are mounted on the stereo camera of FIG. 2(b).

FIG. 5 illustrates an example of the use of lenses with a long focal length, conversely to the case of FIG. 4. When the focal length of the shooting lenses is long, the left and right shooting fields of view match each other at a position far away from a standard view distance (a position represented by a broken line). Also in this case, however, when viewing is performed with the displaying apparatus depicted in FIG. 1, the reference window $W_{ref}''$ actually positioned far away at the position represented by the broken line can be viewed as being near a position of the field-of-view frame $W_{ref}$ represented by the solid line.

According to the description based on FIG. 4 and FIG. 5 above, the use of zoom lenses can be naturally implemented. Even when the focal length of the shooting lenses is varied anyway, the width and spacing of the image pickup devices fitting to the reference dimension display screen calculated by the above equations based on FIG. 2 suffice (in practice, a largish width of the image pickup devices may be used to set a read range). Then, even when the focal length of the shooting lenses of the stereo camera is changed, it is enough to only set, for example, each condition depicted in FIG. 1, in a predetermined state in the stereoscopic television on a viewing side. This is because light beams entering the left and right shooting lenses from the corresponding point at infinity are parallel to each other and also the distance between the optical axes of the shooting lenses is set at the human interpupillary distance. For this reason, the spacing between the corresponding points at infinity projected onto the left and right image pickup devices is equal to the human interpupillary distance.

Even when the focal length of the shooting lenses is changed with respect to the same stereo camera, the width of and spacing between the paired left and right image pickup devices are constant. Therefore, when the focal length of the shooting lenses is changed, the shooting distance where the left and right fields of view match each other is changed. In stereoscopic video, in any cases, a shooting state in which a subject at a distance shorter than the distance where the left and right fields of view match each other is within a shooting field of view is not preferable in general. In a stereo camera, even if a finder is subjected to stereoscopy, it is extremely difficult to visually recognize whether or not a subject within a shooting field of view is within a distance where the left and right fields of view match each other. By displaying collimation patterns depicted in FIG. 11 on the left and right screens of the finder in a superposed manner, viewability can be improved.

Figure 6:
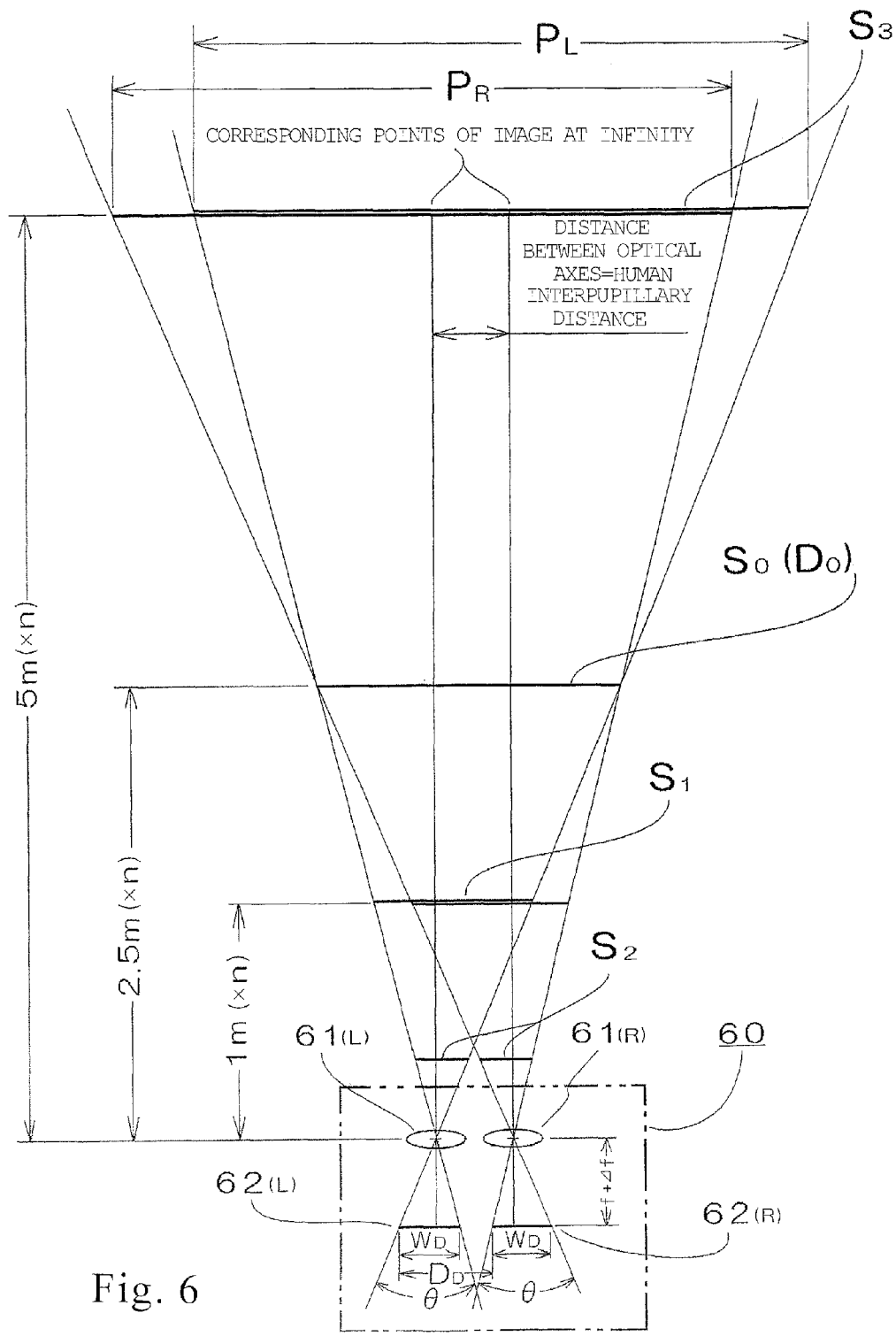
FIG. 6 A descriptive diagram of a stereo projector with two, left and right projection units provided side by side.

A stereo projector 60 depicted in FIG. 6 includes a pair of left and right projection lenses 61L and 61R set with a human interpupillary distance spacing. Furthermore, displays 62L and 62R having a width $W_D$ are placed with a spacing $D_D$ slightly longer than the spacing of the left and right projection lenses 61, thereby matching left and right projection screens each other on a screen $S_0$ equivalent to the reference dimension display screen. Thus, only with focusing on the screen at an arbitrary distance, the projected images are displayed under the same conditions as those in the state depicted in FIG. 1, and a sense of stereoscopy can be obtained by observing from an appropriate viewing distance.

As long as the positions of the displays 62L and 62R are each at a position of an angle of projection θ depicted in the drawing, the size of the width $W_D$ of the display 62 is not restricted, and is determined by a sum of a focal length f and a focus control amount Δf of the lenses, that is, f+Δf, from screens $S_0$ to $S_3$ of the projection lenses, that is, at the entire projection distance. Therefore, the angle of projection θ α depicted in FIG. 6 is set at the same angle as the angle of view a depicted in FIG. 2(b), it is not necessary to set the width $W_S$ of the image pickup devices S depicted in FIG. 2(b) and the width $W_D$ of the display 62 depicted in FIG. 6 at the same width.

However, in the drawings, in practice, the placement position (distance) of the projector and the view distance become equal to each other, and the projector itself becomes an obstruction. This can be solved by multiplying the placement distance (screens $S_0$ to $S_3$) of the projector by n (n>1). Therefore, the relation between the angle of projection θ and the angle of view α depicted in FIG. 2(b) described above is not θ=α, but a relation of θ<α holds.

Figure 7:
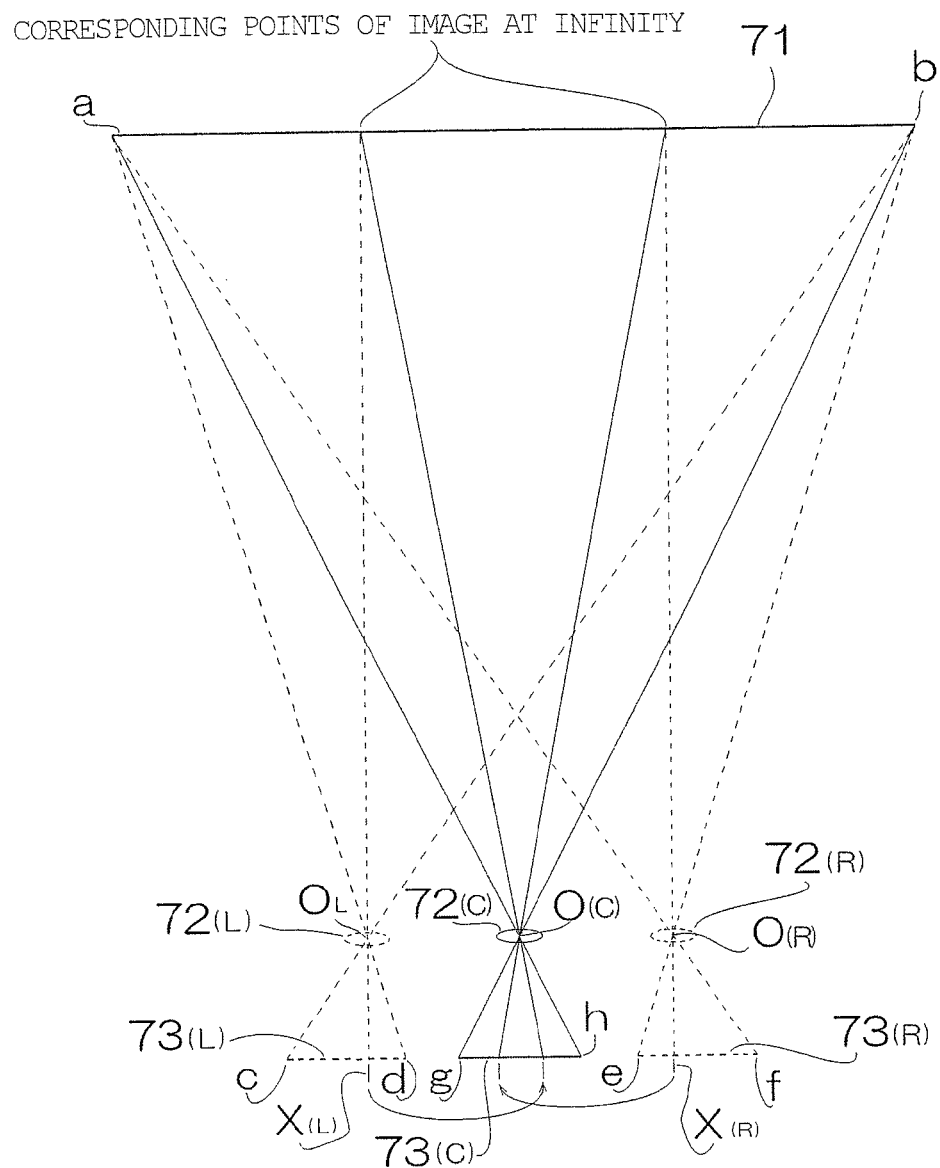
FIG. 7 A descriptive diagram of a stereo projector with a single projection unit.

FIG. 7 is a descriptive diagram when the stereo projector of FIG. 6 in which two projection units are placed side by side is modified with a single unit. Left and right videos displayed on left and right displays 73L and 73R depicted with broken lines form an image by left and right projection lenses 72L and 72R represented by broken lines on a screen 71, with left and right width directions being matched each other. The left and right projected screens match each other on the screen 71 although a distance between optical axes of the left and right projection lenses is set at 65 mm, which is equal to the dimension of a human interpupillary distance, because the spacing between the left and right displays 73L and 73R is set longer than the distance between the optical axes.

A triangle a, $O_{(R)}$, b and a triangle f, $O_{(R)}$, e depicted in FIG. 7 with broken lines are similar figures with the point $O_{(R)}$ as a point of symmetry. Similarly, a triangle a, $O_{(L)}$, b and a triangle d, $O_{(L)}$, c depicted with broken lines and a triangle a, $O_{(C)}$, b and a triangle h, $O_{(C)}$, g depicted with solid lines are similar figures, respectively, with the point $O_{(L)}$ and the point $O_{(C)}$ each as a point of symmetry. Therefore, line segments c-d, g-e, and e-f are equal to each other. Therefore, when the left and right projection lenses $72_{(L)}$ and $72_{(R)}$ depicted with broken lines are moved to an intermediate position of $72_{(C)}$ represented by a solid line, the displays $73_{(L)}$ and $73_{(R)}$ depicted with the broken lines are superposed with an intermediate position $73_{(C)}$ represented by a solid line. Also, as for left and right videos to be displayed on the displays $73_{(L)}$ and $73_{(R)}$, the left and right videos are displayed alternately in a time-division manner by using a single projection unit formed of the projection lens $72_{(C)}$ and the display $73_{(C)}$, this is equivalent to a projector with two left and right projection units placed side by side. And, an image $X_L$ on the display $73_{(L)}$ and an image $X_R$ on the display $73_{(R)}$ each with respect to a corresponding point of an image at infinity formed on the screen 71 with a dimension equal to the distance between the optical axes of the left and right projection lenses are alternately displayed on the display $73_{(C)}$ so as to have a positional relation represented by →. The left and right positions are reversed because an inverted image is displayed on a display for displaying an original image in the projector and is reversed by the projection lenses.

Here, the corresponding points of images at infinity are depicted so as to be viewed at a horizontally symmetric position as depicted, that is, at a screen center position in a state of stereoscopy. However, an actual image at infinity is not restricted to be at the screen center, and this plotting is for convenience of description. However, light beams emitted from the same point of a subject at infinity enter the left and right eyes so as to be parallel to each other. Therefore, even this plotting is assumed to be understood in general.

Figure 8:
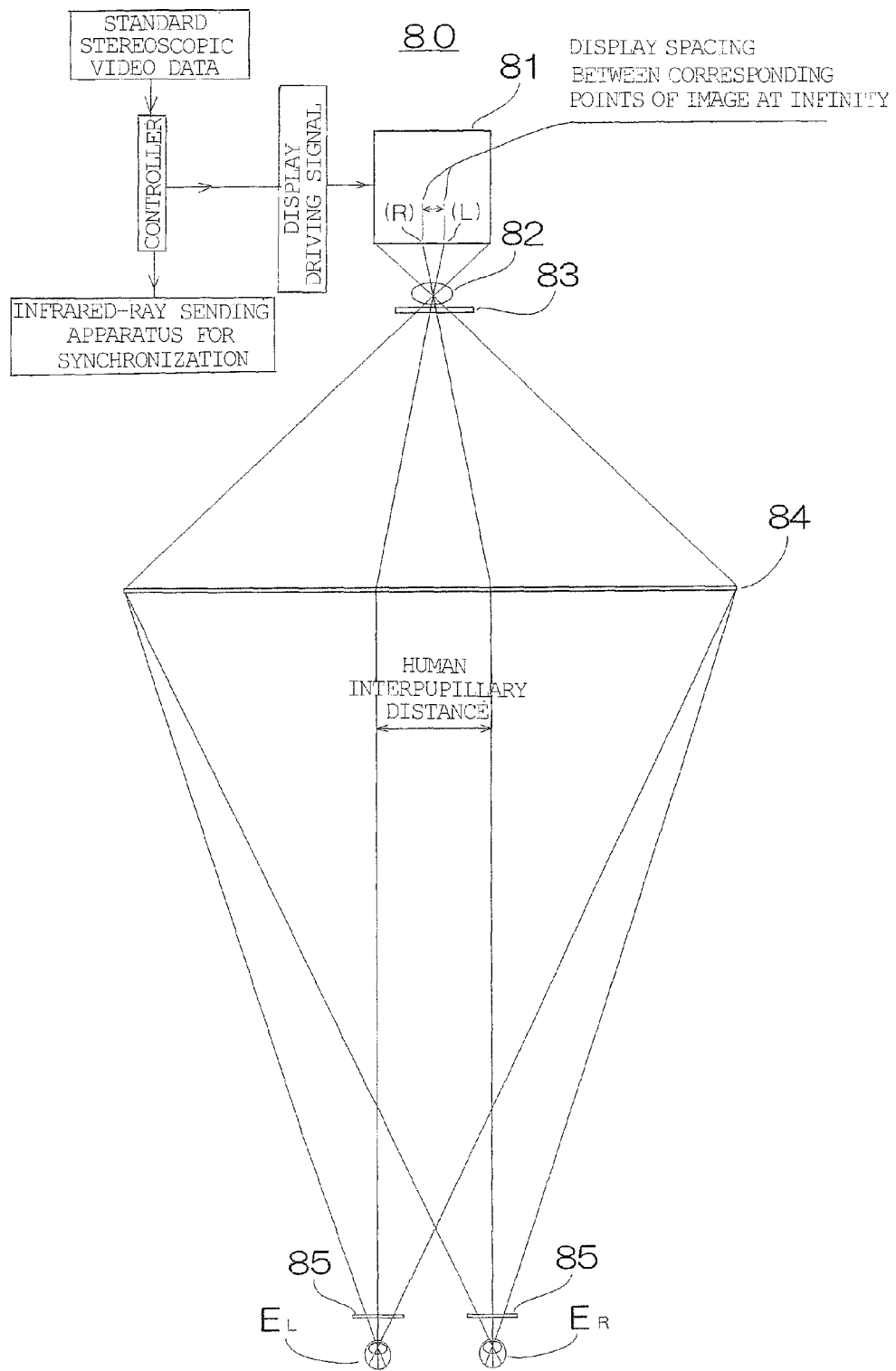
FIG. 8 A descriptive diagram of a rear-projection-type stereoscopic television for linear polarization time-division display with a single projection unit.

FIG. 8 illustrates an example of application of the stereoscopic video displaying apparatus with a single projection unit described above with reference to FIG. 7. A stereoscopic video displaying apparatus 80 (stereoscopic television) is of a rear projection type for projecting video to be displayed on a DMD 81 by a projection lens 82 onto a transmission screen 84 (rear surface). On a front surface of the projection lens 82, a polarizing plate 83 is placed. In this state, when left and right videos are alternately displayed by the DMD 81 in a time-division manner, the left and right videos are alternately displayed on the transmission screen 84 in time series with the same state of polarization. When this stereoscopic video is viewed with the eyeglasses for stereoscopic video viewing described above, stereoscopy can be achieved with the left and right fields of view separated from each other.

Also, when LCOS is used as a display device in place of DMD, since light beams reflected on LCOS are polarized, the polarizing plate 83 depicted in FIG. 8 is not required.

Figure 9:
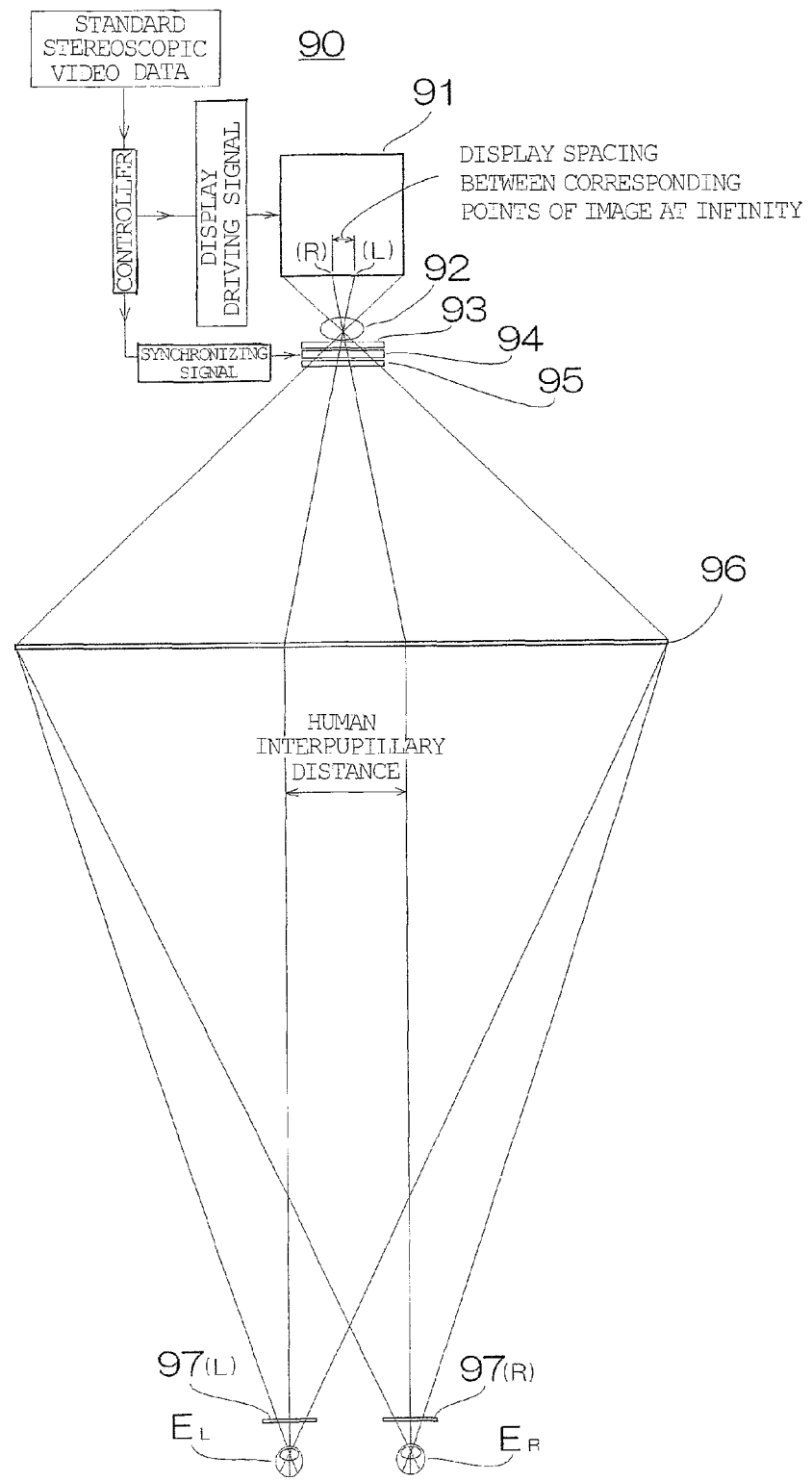
FIG. 9 A descriptive diagram of a rear-projection-type stereoscopic television for circular polarization time-division display with a single projection unit.

FIG. 9 illustrates a stereoscopic video displaying apparatus 90 (stereoscopic television), in which a DMD rear projection unit 91 has a projection lens 92 with its front surface having a polarizing plate 93 placed thereon, and with its front surface having a liquid-crystal cell 94 placed thereon, and further with its front surface having a λ/4 plate 95 placed thereon, thereby alternately displaying stereoscopic left and right videos on the DMD 91 based on standard stereoscopic video data and driving the liquid cell in synchronization with the display image of the DMD 91 for control so that light enters with a relation in which a polarizing direction with respect to a fast axis of the λ/4 plate 95 is 45 degrees and −45 degrees, thereby alternately displaying stereoscopic video on the transmission screen 96 with circular polarization in clockwise and counterclockwise directions. In this case, by using circular-polarizing eyeglasses for viewing, no crosstalk occurs even when the eyeglasses are tilted.

Also, in the apparatus 90 described above, when LCOS is used in place of DMD, the polarizing plate 93 is not required.

In a stereo camera for television broadcasting, it is preferable to be able to observe a shooting field of view reflected on a stereoscopic finder and directly view an actual at the same time. To achieve such a stereoscopic finder (monitor), for example, the liquid-crystal display of a 12-inch width depicted in FIG. 1 is mounted on a stereoscopic television camera. The 12-inch-size monitor is among large ones as a camera monitor but, as depicted in the drawing, viewing can be made from a position of 350 mm. In this case, left and right images are alternately displayed in a time-division manner. At the same time, infrared rays for synchronization are sent from a synchronizing signal sending apparatus mounted on the display (not shown). And, on the left and right sides of eyeglasses for stereoscopic video viewing in which left and right fields of view are separated, left and right polarizing plates identical to each other are mounted, respectively. Furthermore, on its front surface, a liquid-crystal plate is mounted. Also, on the eyeglasses, a tilt-angle sensor is mounted. Left and right light beams alternately discharged from the LCD described above are polarized light beams identical to each other and in a predetermined direction. When the polarizing plates of the eyeglasses described above are set in a direction orthogonal to a direction of interrupting the polarized light beams discharged from the LCD, the left and right fields of view of the eyeglasses are closed to become dark. The state of the fields of view is changed in a manner such that a polarizing direction of incident light from the LCD is optically rotated by 90 degrees or 270 degrees by the liquid-crystal plate mounted on the front surface to cause both of the left and right fields of view to be in an open state and viewed brightly. When a voltage is alternately applied to the liquid-crystal plates mounted on the front surface of the eyeglasses with infrared rays sent in synchronization with a display image on the LCD, the liquid crystal becomes in a tension state with that voltage. As for polarized light discharged from the LCD, the polarizing direction is kept as it is, and light-shielding is made by the liquid-crystal plates of the eyeglasses to cause the fields of view to be dark. At the same time, when a voltage is alternately applied to the liquid-crystal plates of the eyeglasses in synchronization with the LCD with infrared rays, the left and right fields of view are alternately opened and closed, and the left and right fields of view for viewing the LCD is separated, thereby allowing stereoscopy. Also, when the eyeglasses are tilted, a relative directional relation between the LCD and the polarizing direction of the eyeglasses is distorted to cause crosstalk. The crosstalk is prevented by controlling and correcting the applied voltage with the tilt-angle sensor. Here, in the electronic imaging apparatus, the finder is not required to be integrated with the camera. For example, when a stereo camera configured of a pair of left and right shooting lenses and a pair of left and right image pickup devices and a notebook personal computer are connected to each other via a USB cable or the like, the PC itself serves as a finder.

Figure 10:
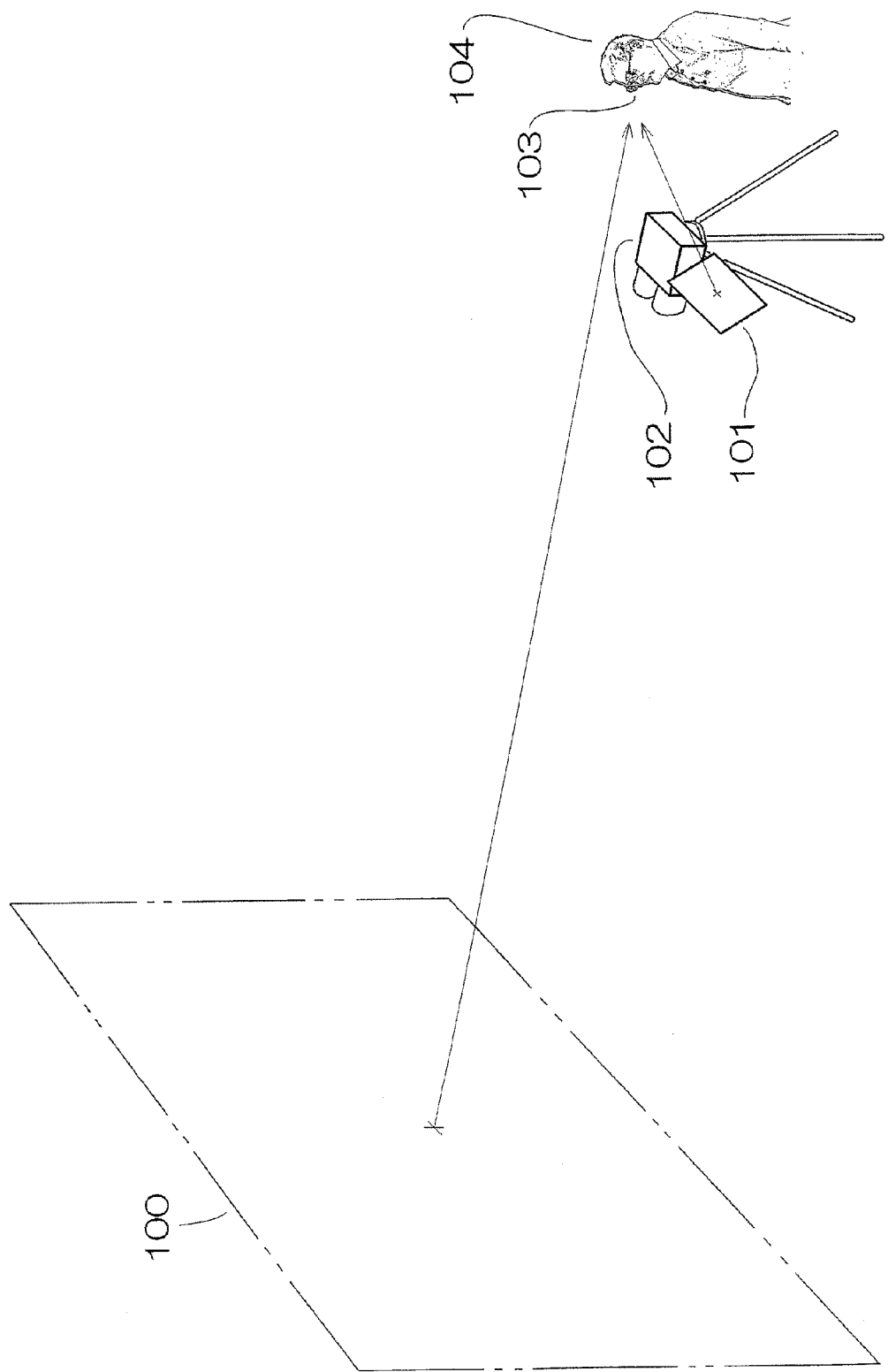
FIG. 10 A descriptive diagram of a stereoscopic television camera allowing a stereoscopic image to be observed on a stereoscopic monitor and also an actual scene to be viewed at the same time.

FIG. 10 illustrates an embodiment of the stereoscopic television camera described above, and a two-dot-chain line 100 depicted in the drawing represents a reference window, which has been described above. This reference window is substantially a field of view of the camera, and is a field-of-view frame virtually set on an actual scene to be shot by the stereo camera. This virtual field-of-view frame represents a state equivalent to a state of viewing outer scenery from, for example, a house window or the like. However, since no frame is present in an actual scene, as a matter of course, a cameraperson 104 directly views, through eyeglasses for stereoscopic video viewing 103 over a stereoscopic television camera 102, not only a shooting field of view (the reference window 100 depicted in the drawing) but also a scene outside the shooting field of view. Then, when casting an eye onto a monitor 101, the person can view stereoscopic video of the same size and same sense of distance (the video can be viewed as such, although the actual display dimensions are different) as those of the reference window 100 on (in) the monitor 101.

A relation between the width of the monitor-purpose display 101 of FIG. 10 and an appropriate viewing distance is such that, when it is assumed in FIG. 3 that $L_1=350$ mm, left and right display screen widths are:

for $W_{P1}$, $W_{P1}=W_{P0}\times L_1/L_0$, and when it is assumed that $W_{P0}=1800$ mm and $L_0=2500$ mm, each of the left and right display screen width $W_{P1}$ is $W_{P1}=1800\times350/2500=252$ mm.

A spacing between the left and right screens, that is, a picture distance, is represented by $D_{P1}$ in FIG. 3, and when $D_{PN}=B(1-L_N/L_0)$ represented above, and $D_{P1}=B(1-L_1/L_0)$, and when the interpupillary distance is $B=65$ mm, $D_{P1}=65 (1-350/2500)=55.9$ mm The distance between the centers of the left and right image display screens, that is, the picture distance, is as described with FIG. 3 for display, and the spacing between the corresponding points of images at infinity is set at 65 mm, which is equal to the human interpupillary distance, for display. In FIG. 3, $D_{P1}$ (R) represents a screen for right and $D_{P1}$ (L) represents a screen for left. At this time, the size (entire width) of the display $D_1$ is:

a total of $W_{P1}$ and $D_{P1}$, and $W_{P1}+D_{P1}=252+55.9=307.9$ mm

This dimension is slightly longer than 12 inches, that is, $12\times25.4=304.8$ mm, because the viewing distance itself is processed as a numerical value in steps of 10 mm for representation. Also, in practice, a bit longer viewing distance poses no problem.

Also, conversely, when the viewing distance $L_1$ is calculated from the display size, when it is assumed in FIG. 3 that $L_1=L_0(W_{P1}+D_{P1}-B)/(W_{P0}-B)$.

$W_{P1}+D_{P1}=12''=304.8$ mm, $B=65$ mm, $W_{P0}=1800$ mm, and $L_0=2500$ mm, the viewing distance $L_1$ is $L_1=2500(304.8-65)/(1800-65)=345.53$ mm.

Figure 11:
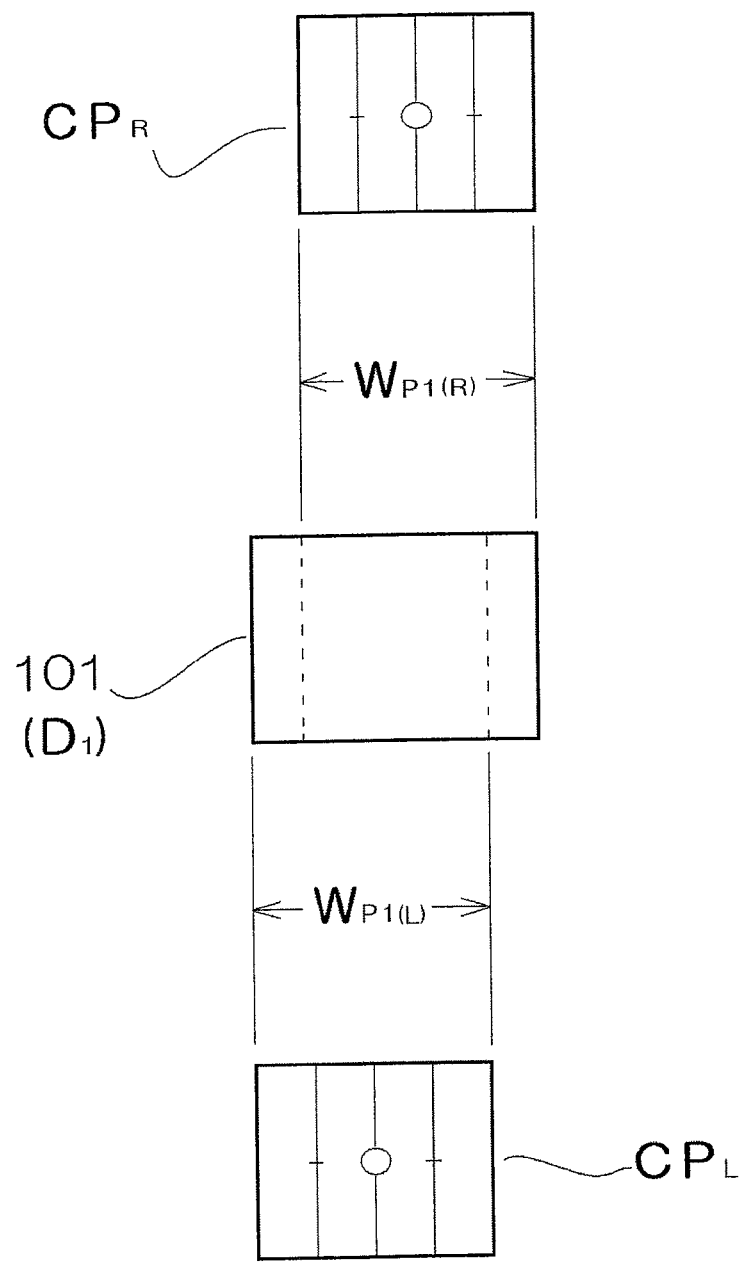
FIG. 11 An embodiment of a collimation pattern for display on the stereoscopic monitor.

Furthermore, to facilitate viewability of stereoscopy of the monitor of the stereoscopic television camera, a collimation pattern mainly formed of vertical lines is superposed and displayed by software on each of the left and right images to be displayed. FIG. 11 is a detailed diagram of a monitor 101 of the stereoscopic television camera 102 of FIG. 10. On the monitor 101 (display $D_1$), a collimation pattern is displayed by software at a position so that each pattern and the left and right images superpose each other. As a matter of course, the collimation patterns are displayed only on the finder, and image data sent from the stereo camera is imaged image data only.

When the liquid-crystal monitor 101 of the stereoscopic television camera 102 described from p. 36, l. 20 to p. 40, l. 8 of Specification is stereoscopically viewed through the eyeglasses for stereoscopic video viewing 103, the state of adjusting the sense of stereoscopy can be visually recognized. And, the stereoscopic video viewed on the monitor of this stereoscopic television camera allows the sense of three dimensions in exactly the same state as that of a viewer receiving stereoscopic broadcasting shot and sent by this stereoscopic television camera and viewing stereoscopic television.

Furthermore, whether in mono or stereo, when moving pictures are shot, it is important to know the progress of situations simultaneously at the time of shooting. Therefore, an operational effect of this television camera configured so as to allow an actual scene to be always viewed while monitoring is enormous.

The stereoscopic video imaging apparatus described from p. 36, l. 20 to p. 40, l. 25 of Specification is extremely effective, but the finder (monitor) portion is large, posing problems in hand-held shooting, portability, and others. Also, light shielding of the finder portion is incomplete, posing a problem in which it is difficult to view a finder image in a bright shooting environment.

Figure 12:
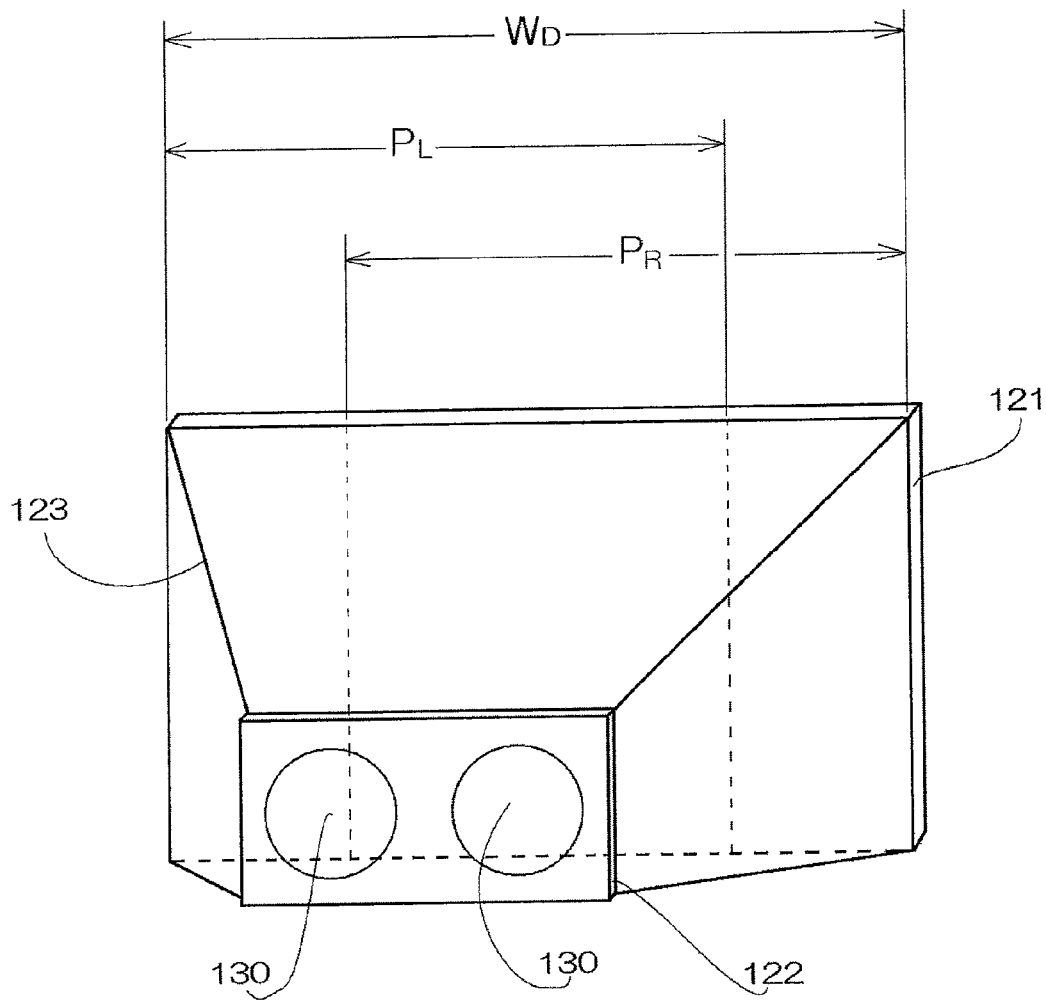
FIG. 12 A perspective view of a stereoscopic video displaying apparatus.

FIG. 12 is a perspective view of a stereoscopic finder with eyeglasses for field-of-view separation fixed on a display, in which a display 121 of a stereoscopic finder 120 and a board 122 holding eyeglasses for field-of-view separation 130 are fixed by a casing 123. The display 121 is an LCD, for example, and alternately displays left and right videos so as to display the left video at a $P_L$ portion on a screen width $W_D$ depicted in the drawing and the right video in a $P_R$ portion thereon depicted in the drawing and separates the left and right fields of view in synchronization with the eyeglasses for field-of-view separation 130 for stereoscopy. Since the field of view is light-shielded from external light with the casing 123, the display can be clearly viewed even under a bright environment outdoors. Also, since the eyeglasses for field-of-view separation is fixed to the display, there is no fear of crosstalk even when the observer tilts his or her head.

Figure 13:
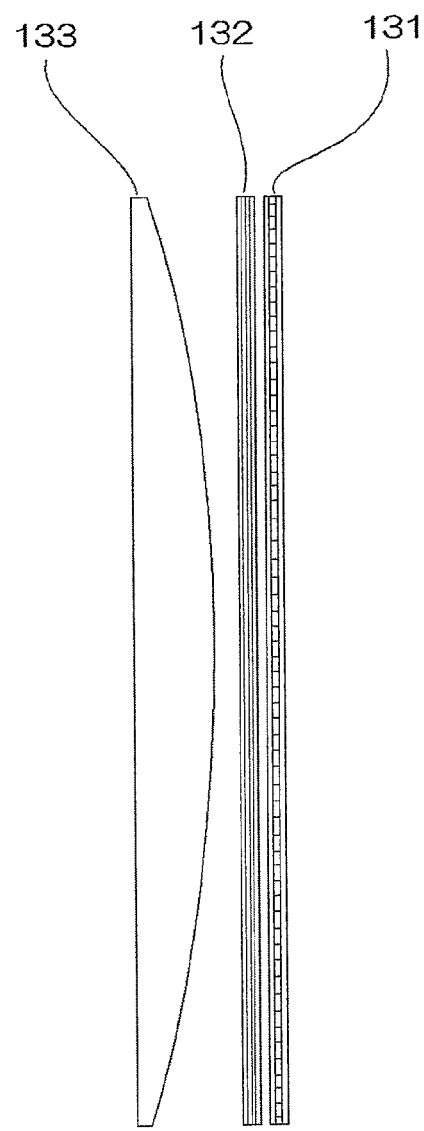
FIG. 13 A section view of eyeglasses for field-of-view separation and eyeglasses for diopter correction for the stereoscopic video displaying apparatus of FIG. 12.

Irrespectively of either large or small size as described with reference to FIG. 3, the finder (display) can be viewed equivalently to the reference dimension display screen, depending on how to display and the viewing distance. However, in consideration of tilt ability, a smaller display size is preferable. When the display size is small, the distance of viewing the display is shorter than the distance of distinct vision. When the observation distance is shorter than the distance of distinct vision, a diopter correction lens (plus diopter) depicted in FIG. 13 is required even for a person with normal vision. Also, with a movement (not shown) of a diopter correction lens 133 in an optical axis direction, adjustment can be made according to the diopter of the observer.

FIG. 13 is a configuration diagram of the eyeglasses for field-of-view separation 130 of the stereoscopic video displaying apparatus 120 of FIG. 12 depicted above, and the eyeglasses are mainly formed of a polarizing plate 132 and a liquid crystal plate 131. When the display 121 of the stereoscopic video displaying apparatus 120 of FIG. 12 is an LCD, display light is polarized light, and when the polarizing plate 132 depicted in FIG. 13 is placed (on both left and right) in an orthogonal direction in a state of light-shielding the polarized light mentioned above with respect to amplifying direction of display light, the field of view is closed. And, when the liquid-crystal plate is placed ahead of the polarizing plate 132 depicted in the drawing, display light of the LCD is rotated by 90 degrees or 270 degrees to be in a state of opening the field of view. In this state, when a voltage is applied to the liquid crystal plate 131, the twisted liquid crystal is linearly strained and light passes though as it is without being rotated by the liquid-crystal plate 131, and therefore light is shielded by the polarizing plate 132 to close the field of view. By applying a voltage to the liquid-crystal plate 131 depicted in FIG. 13 in synchronization with display of the display 121 depicted in FIG. 12, the left and right fields of view are separated for stereoscopy. Here, in the description above, although the field of view is in a closed state when a voltage is applied to the liquid-crystal plate 131 depicted in FIG. 13, if the polarizing plate 132 is placed in the same direction as that of a polarizing plate on the surface of the display (LCD) 121 depicted in FIG. 12, the field of view is in an open state when a voltage is applied to the liquid-crystal plate 131.

Here, when a non-polarizing material, such as an organic EL, is used as a display, if so-called shutter eyeglasses with one more polarizing plate further added to the front surface of the liquid-crystal plate 131 of FIG. 13 are used, the operation goes the same. Also, when a discharge lamp that lights at commercial frequencies is viewed with the shutter eyeglasses, flicker occurs. However, the finder 120 of FIG. 12 is shielded from external light. Since light beams viewed through the eyeglasses for field-of-view separation 130 are light beams of the display only, even if the eyeglasses for field-of-view separation 130 is shutter eyeglasses, flicker does not occur.

Here, in the description from p. 40, l. 26 to p. 43, l. 4 of Specification, the finder of the stereoscopic imaging apparatus is assumed, but this is merely an embodiment of the stereoscopic video displaying apparatus of another embodiment, and can be used as a normal stereoscopic video displaying apparatus. Also, the casing 123 of the stereoscopic video displaying apparatus 120 depicted in FIG. 12 may be other than that depicted in the drawing. For example, bellows, a foldable focusing hood as seen in conventional cameras, and others may be used (not shown).

In the case of a stationary-type stereoscopic video displaying apparatus, the display size is desirably large to some extent. This is because, in general, the larger the display size, the easier to increase resolution. When a large screen is viewed, if each observer uses eyeglasses for field-of-view separation, many people can advantageously view at the same time. However, in consideration of a sanitation problem of reusing eyeglasses used by others in public environment, a technique of mounting eyeglasses onto a display for peering still has an advantage. Even in this case, the display is desirably large to same extent. And, when the position where the display is placed, that is, the view distance, is desirably at a distance longer than the distance of distinct vision. At a distance longer than the distance of distinct vision, the diopter correction lens 133 depicted in FIG. 13 is not required, and diopter correction eyeglasses normally used by each observer may be used, or no eyeglasses may be worn, according to situations similar to those at the time of usually viewing something.

Conventionally, the electronic stereoscopic video imaging and display apparatuses and stereo photographs with two screens placed side by side have pursued different paths. However, in recent years, with advance of electronic video (image) machines, there is a demand for handling both as one, but it has not yet been fulfilled to date. To respond to this demand, the invention described in an embodiment of the present application is directed to a technique capable of fabricating a stereo photo print of two-screen side-by-side mode from one frame (paired left and right screens) projected on an electronic stereoscopic video displaying apparatus (for example, stereoscopic television) or freely fabricating a stereo slide of two-screen side-by-side mode from standard stereoscopic video data shot by a digital stereo camera.

According to FIG. 1, when left and right images are placed in a horizontal side-by-side display range depicted in the drawing and viewed (requiring diopter correction lenses because the viewing distance is extremely shorter than the distance of distinct vision), left and right fields of view match each other at the position of the large-sized television depicted in the drawing, and it looks as if a large-sized television exists at the display position depicted in the drawing. FIG. 3 is a detailed diagram of FIG. 1. When standard stereoscopic data is displayed on left and right screens ($D_2$ (L) and $D_2$ (R) depicted in the drawing) placed side by side for display on the reference display $D_0$, the display screen becomes small, as a matter of course. Although the size of the display screen is a matter of general concern even in conventional mono video, the problem that has not been considered is how to determine the spacing between the left and right screens According to FIG. 3, when it is assumed that the placement distance of the display $D_0$ of a reference dimension display screen is $L_0$, the position of the stereo print (slide) $D_2$ where left and right images are placed side by side (viewing distance) is $L_2$, and a human interpupillary distance is B, the spacing between the left and right screens ($D_{P2}$ depicted in the drawing) of the stereo print (slide) is determined as $D_{P2} = B(1-L_2/L_0)$.

Second Embodiment

The present invention actualizes stereoscopic television broadcasting and, in addition to that, allows stereoscopic video to be put on the Internet to present stereoscopic video of products for mail-order selling or the like. Also, describing about handling of products with their stereoscopic video is more effective than demonstration of actual products. This is because actual products have to be exhibited even some of them are unmarketable, which poses a problem in space efficiency and, even if many products are exhibited, products actually marketable are usually very limited, thereby causing a risk of obsolescence of unsold inventory. With an exhibition with stereoscopic video, the number of products to be actually displayed in stores can be significantly reduced.

Other than that, for the purpose of sale, it is effective to use stereoscopic video also for sale of automobiles and furniture. It is extremely effective not only for a salesperson to bring recorded video for demonstration but also for over-the-counter sale. The reason for this is that, since automobiles, furniture, and others require a vast exhibition space, many products cannot be exhibited. Also, it is economically impossible to prepare many high-priced products for exhibition and, furthermore, it may be impossible to present an actual use scene of some actual products. This goes the same for sale of apparel and others, and a fashion show can be presented as stereoscopic video.

Still further, in the example of sale of commodities described above, mobile exhibition is possible even for a large product, but in housing-related exhibition, such as the one for a room of an apartment, mobile exhibition of an actual product is impossible. In this case, the present invention is very effective.

Described above are sales-related examples of application. Other than that, the present invention is very effective when used as a guide for sightseeing.

Furthermore, an example of application unique to stereoscopic video is a educational training system. Description of various mechanical instruments and the structure and handling of aircraft is easier to understand with explanation with real pictures and stereoscopic animation rather than with explanation of an actual instrument or aircraft.

Still further, an example of most effective application is in the field of medical education. For example, a first step in surgery as an intern is to look at an operation near a person conducting it. In practice, however, it is impossible to place many onlookers around an operating table and the place may not be able to be actually viewed clearly even by looking nearby. In this case, a commentator describes video shot by a stereo camera (moving pictures are shot and recorded, and a necessary portion is advanced frame by frame to be repeatedly viewed in slow motion), and medical students can view it stereoscopically on a display of a personal computer on each desk or on a large-sized TV. In a conventional projection-type stereoscopic screening system, clear images cannot be obtained without a dark environment, and therefore it is required to reduce lighting or shield light from a window, which is not appropriate in an educational site. According to a stereoscopic television system of the present invention, sharp stereoscopic video can be viewed even under a bright environment.

Still further, in medical care, support from a medical specialist can be obtained with stereoscopic video through a communication line from a remote place, which contributes to telemedicine.

Here, in an example of medical application, a connection with a stereoscopic endoscopic camera allows stereoscopic viewing of the inside of a body cavity. In this case, a feature of the stereoscopic television system of the present application is such that, during stereoscopic viewing with a television (display), a line of sight can be moved to a surrounding environment with the state unchanged (without removal of eyeglasses for stereoscopy). Also, according to the liquid-crystal display, viewing can be made without reducing lighting.

Still further, stereoscopy is required especially in the field of atomic energy. To protect operators and surrounding environments from radioactivity, the present invention is expected to be applied to a monitor for remote control and monitoring.

Here, the present invention can be variously modified as long as modifications do not deviate from the spirit of the invention and, as a matter of course, the present invention covers these modifications.

INDUSTRIAL APPLICABILITY

The present invention is used for making video (image) stereoscopic in the field of transmission and reception of images using television broadcasting and communication lines and other fields, by utilizing the same video data even with different models of displaying apparatus.

The invention claimed is:

1. A stereoscopic video imaging display system, wherein one reference window, which is a virtual field-of-view frame, is set in a field of view of a stereoscopic video imaging apparatus in which imaging units each formed of a shooting lens and an image pickup device are placed on left and right in parallel to each other; in a state in which the reference window is projected in a reduced manner by the left and right shooting lenses to form an image on each of the left and right image pickup devices, the left and right image pickup devices are placed in accordance with a width of each of left and right projected images of the reference window or image data equivalent to the width of the projected image of the reference window is read as standard stereoscopic video data; on an apparatus on a display side, left and right videos are displayed on a reference dimension display screen approximately equivalent to the reference window at the time of shooting the standard stereoscopic video data, with different polarizations simultaneously or in a time-division manner, or the left and right videos are displayed with polarizations in a same direction in a time-division manner; polarizing eyeglasses or liquid-crystal shutter eyeglasses for separate viewing of left and right fields of view according to a display scheme or a liquid-crystal plate is mounted immediately before each of left and right polarizing plates identical to each other; and the liquid-crystal plates are alternately driven for separate viewing, and wherein a video for left is displayed at an inner position which contacts with a line connecting both ends of the reference dimension display screen and a left eye of an observer, and a video for right is displayed at an inner position which contacts with a line connecting both ends of the reference dimension display screen and a right eye of an observer, the left and right distance between infinity images is displayed at between 58 and 72 mm which is an interpupillary distance of a human, so, the left and right stereoscopic images can be seen in the same size as the reference dimension display screen.

2. The stereoscopic video imaging display system according to claim 1, wherein digital TV broadcasting waves are used as data conveying means from the stereoscopic video imaging apparatus that obtains the standard stereoscopic video data to a stereoscopic video displaying apparatus.

3. The stereoscopic video imaging display system according to claim 1, wherein a communication line is used as data conveying means from the stereoscopic video imaging apparatus that obtains the standard stereoscopic video data to a stereoscopic video displaying apparatus.

4. A stereoscopic video imaging display system comprising:

a stereoscopic video imaging apparatus having left and right imaging units, the left imaging unit comprising a left shooting lens and a left image pickup device, the right imaging unit comprising a right shooting lens and a right image pickup device, the left and right imaging units placed parallel to each other with an angle of view and positioned to project a reference window of a virtual field of view frame in a reduced manner to form an image on each of the left and right image pickup devices, each of the left and right image pickup elements having a pickup element width;

wherein the left and right image pickup devices are placed in accordance with a width of each of left and right projected images of the reference window is read as standard stereoscopic video data; and a reference dimension display screen having a display screen width and left and right screens exactly matching each other and having a position and size for reproducing the reference window coupled to said stereoscopic video imaging apparatus, said reference dimension display screen receiving the standard stereoscopic video data and displaying the reference window at the time of shooting the standard stereoscopic video data on each of the left and right screens with a display magnifying power equal to a ratio between the display screen width and the pickup element width, whereby the stereoscopic video imaging display system reproduces a state of stereoscopy with high fidelity and shot data is capable of being commonly shared as standard stereoscopic data irrespective of a type and size of the reference dimension display screen.

5. A stereoscopic video imaging display system for displaying stereoscopic images on different displays without adjustment comprising:

a stereoscopic video imaging apparatus having left and right imaging units, the left imaging unit comprising a left shooting lens and a left image pickup device, the right imaging unit comprising a right shooting lens and a right image pickup device, the left and right imaging units placed parallel to each other with an angle of view and positioned to project a virtual field of view frame in a reduced manner to form an image of the virtual field of view frame on each of the left and right image pickup devices;

wherein the left and right image pickup devices are placed in accordance with a width of each of left and right projected images of the virtual field of view frame, the images of the virtual field of view frame on the left and right image pickup devices are read and form standard stereoscopic video data;

a stereoscopic video display screen comprising left and right screens exactly matching each other and having a position and size for reproducing and displaying the virtual field of view frame in full size and equivalent to the virtual field of view frame at the time of shooting the standard stereoscopic video data; and data conveying means, coupled to said stereoscopic video imaging apparatus and said stereoscopic video display screen, for transmitting the standard stereoscopic video data from said stereoscopic video imaging apparatus to said stereoscopic video display screen, whereby the stereoscopic video imaging display system reproduces a state of stereoscopy with high fidelity and shot data is capable of being commonly shared as the standard stereoscopic video data irrespective of a type and size of said stereoscopic video display screen.

6. The stereoscopic video imaging display system according to claim 5, wherein digital TV broadcasting waves are used as said data conveying means between the stereoscopic video imaging apparatus and said stereoscopic video displaying screen.

7. The stereoscopic video imaging display system according to claim 5, wherein a communication line is used as said data conveying means between the stereoscopic video imaging apparatus and said stereoscopic video displaying screen.

* * * * *